US012355525B2

(12) United States Patent
Lee et al.

(10) Patent No.: US 12,355,525 B2
(45) Date of Patent: Jul. 8, 2025

(54) IMAGE DISPLAY DEVICE

(71) Applicant: LG ELECTRONICS INC., Seoul (KR)

(72) Inventors: Kyuin Lee, Seoul (KR); Jaewook Song, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 18/272,069

(22) PCT Filed: Jun. 10, 2021

(86) PCT No.: PCT/KR2021/007287
§ 371 (c)(1),
(2) Date: Jul. 12, 2023

(87) PCT Pub. No.: WO2022/154194
PCT Pub. Date: Jul. 21, 2022

(65) Prior Publication Data
US 2024/0088961 A1  Mar. 14, 2024

(30) Foreign Application Priority Data
Jan. 13, 2021 (KR) .................. 10-2021-0004709

(51) Int. Cl.
*H04B 7/06* (2006.01)
(52) U.S. Cl.
CPC ......... *H04B 7/0617* (2013.01); *H04B 7/0634* (2013.01); *H04B 7/06952* (2023.05)
(58) Field of Classification Search
CPC .................................................. H04B 7/0617
(Continued)

(56) References Cited

U.S. PATENT DOCUMENTS

2009/0121945 A1* 5/2009 Tani .................. H01Q 9/16
343/702
2017/0078004 A1  3/2017  Capar et al.
(Continued)

FOREIGN PATENT DOCUMENTS

KR  10-1729858  4/2017
KR  10-2018-0134625  12/2018
(Continued)

OTHER PUBLICATIONS

PCT International Application No. PCT/KR2021/007287, International Search Report dated Sep. 27, 2021, 5 pages.
(Continued)

*Primary Examiner* — Lihong Yu
(74) *Attorney, Agent, or Firm* — LEE, HONG, DEGERMAN, KANG & WAIMEY

(57) ABSTRACT

The present invention relates to an image display device. An image display device according to an embodiment of the present invention comprises: a display; and a wireless transmission device which is spaced apart from the display and transmits image data to the display by a wireless communication method, wherein the wireless transmission device includes at least one antenna device for wirelessly transmitting image data to the display, and the wireless transmission device generates, for beamforming tracking of a beam output from the antenna device, a beamforming candidate list including some of a plurality of antenna-based indexes corresponding to a peripheral region around the antenna device, and when a difference in a signal-to-noise ratio or a metric difference between a first index and a second index adjacent to the first index among some of the plurality of antenna-based indexes is less than a beam gain, the wireless transmission device excludes the second index from the beamforming candidate list. Accordingly, it is possible to quickly perform beamforming tracking when a blocker (Continued)

occurs between the wireless transmission device and the display, which are arranged apart from each other.

11 Claims, 16 Drawing Sheets

(58) Field of Classification Search
USPC .......................................................... 375/267
See application file for complete search history.

(56)    References Cited

U.S. PATENT DOCUMENTS

| | | | |
|---|---|---|---|
| 2018/0062720 A1 | 3/2018 | Islam et al. | |
| 2019/0044601 A1* | 2/2019 | Chang | H04B 7/0695 |
| 2019/0115967 A1 | 4/2019 | Islam et al. | |
| 2019/0182786 A1* | 6/2019 | Wang | H04B 7/088 |
| 2019/0386734 A1* | 12/2019 | Nilsson | H04B 7/0814 |
| 2022/0167241 A1* | 5/2022 | Kenington | H04W 48/04 |

FOREIGN PATENT DOCUMENTS

| | | |
|---|---|---|
| KR | 10-2019-0042373 | 4/2019 |
| KR | 10-2072751 | 2/2020 |
| WO | 2017180335 | 10/2017 |

OTHER PUBLICATIONS

European Patent Office Application Serial No. 21919818.1, Search Report dated Nov. 13, 2024, 10 pages.

* cited by examiner

| | Horizontal | | | | | | | | |
|---|---|---|---|---|---|---|---|---|---|
| | | 70 | 45 | 30 | 14 | 0 | -15 | -30 | -45 | -70 |
| Vertical | -70 | – | 29 | 28 | 27 | 11 | 39 | 40 | 41 | – |
| | -45 | 26 | 25 | 24 | 23 | 10 | 36 | 37 | 38 | 62 |
| | -30 | 22 | 21 | 20 | 19 | 9 | 33 | 34 | 35 | 58 |
| | -15 | 18 | 17 | 16 | 15 | 8 | 30 | 31 | 32 | 54 |
| | 0 | 4 | 3 | 2 | 1 | 0 | 5 | 6 | 7 | 4 |
| | 15 | 54 | 53 | 52 | 51 | 12 | 42 | 43 | 44 | 18 |
| | 30 | 58 | 57 | 56 | 55 | 13 | 45 | 46 | 47 | 22 |
| | 45 | 62 | 61 | 60 | 59 | 14 | 48 | 49 | 50 | 26 |
| | 70 | – | 41 | 40 | 39 | 11 | 27 | 28 | 29 | – |

IMAGE DISPLAY DEVICE

CROSS-REFERENCE TO RELATED APPLICATIONS

This application is the National Stage filing under 35 U.S.C. 371 of International Application No. PCT/KR2021/007287, filed on Jun. 10, 2021, which claims the benefit of earlier filing date and right of priority to Korean Application No. 10-2021-0004709, filed on Jan. 13, 2021, the contents of which are all hereby incorporated by reference herein their entirety.

BACKGROUND

1. Field

The present disclosure relates to an image display apparatus, and more particularly, to an image display apparatus which may perform rapid beamforming tracking in case in which a blocker is generated between a wireless transmission apparatus and a display disposed to be spaced apart from each other.

2. Description of the Related Art

An image display apparatus is a device having the functionality of displaying an image. The image display apparatus outputs images in various manners such as output of an image through a display panel or projection of an image to the outside by means of visible light.

Meanwhile, with the tendencies of enlargement and luxurious qualities of the image display apparatus, a display of the image display apparatus and a wireless transmission apparatus supplying a video signal to the display are provided spaced to be apart from each other.

Between the display and the wireless transmission apparatus, a data transmission rate may be lowered in case in which transmitting wireless image data, and thus, research into a method which can perform stable transmission of stable wireless image data is underway.

Meanwhile, World Patent Publication No. WO2020-22619 (hereinafter, referred to as 'prior literature') discloses a method for beamforming in wireless data transmission between the display and the wireless transmission apparatus.

However, according to the prior literature, since a candidate group is selected based on a signal to noise ratio in case in which selecting the candidate group, a beam having a large beamwidth has candidate lists of the same direction, and in case in which a blocker is generated, there is a disadvantage in that a rapid reaction is not made.

Further, according to the prior literature, in case in which the wireless transmission apparatus moves or rotates, all beam indexes of the wireless transmission apparatus and the display are found by a combination, so there is a disadvantage in that a beam searching time takes a long time.

SUMMARY

The present disclosure has been made in view of the above problems, and an aspect of the present disclosure is to provide an image display apparatus which may perform rapid beamforming tracking in case in which a blocker is generated between a wireless transmission apparatus and a display disposed to be spaced apart from each other.

Another aspect of the present disclosure is to provide an image display apparatus which may perform rapid beamforming tracking in case in which at least one of the wireless transmission apparatus or the display disposed to be spaced apart from each other rotates or moves.

Yet another aspect of the present disclosure is to provide an image display apparatus which may maintain a valid candidate list for beamforming tracking.

Still yet another aspect of the present disclosure is to provide an image display apparatus which may stably perform transmission of wireless image data between the wireless transmission apparatus and the display disposed to be spaced apart from each other.

Still yet another aspect of the present disclosure is to provide an image display apparatus which may perform seamless image display between the wireless transmission apparatus and the display disposed to be spaced apart from each other.

In an aspect of the present disclosure, the object disclosed above and other objects can be accomplished by the provision of an image display apparatus. The image display apparatus includes: a display; and a wireless transmission apparatus spaced apart from the display and configured to transmit image data to the display by a wireless communication, and the wireless transmission apparatus includes at least one antenna apparatus for wirelessly transmitting the image data to the display, and the wireless transmission apparatus is configured to generate a beamforming candidate list including some of a plurality of antenna weight vector based indexes corresponding to an area around the antenna apparatus for beamforming tracking of a beam outputted by the antenna apparatus, and in case in which a difference in signal to noise ratio or a difference in metric between a first index among some of the plurality of antenna based indexes and a second index adjacent to the first index is less than a beam gain, exclude the second index from the beamforming candidate list.

Meanwhile, a level of the first index is greater than a level of the second index.

Meanwhile, the wireless transmission apparatus is configured to exclude the second index from the beamforming candidate list in case in which the difference in signal to noise ratio between the first index among some of the plurality of antenna based indexes and the second index adjacent to the first index is less than a gain of a side lobe of the beam.

Meanwhile, the wireless transmission apparatus is configured to increase the number of indexes deleted from a candidate list adjacent to the first index as a beamwidth of a main lobe of the beam increases.

Meanwhile, the wireless transmission apparatus is configured to delete the second index adjacent to the first index from the candidate list in case in which the beamwidth of the main lobe of the beam is a first beamwidth, and delete the second index and a third index adjacent to the first index from the candidate list in case in which the beamwidth the beamwidth of the main lobe of the beam is a second beamwidth larger than the first beamwidth.

Meanwhile, the wireless transmission apparatus is configured to select indexes in case in which the signal to noise ratio or the metric is equal to or more than a reference value among a plurality of antenna based indexes for each region according to a horizontal angle and a vertical angle around the antenna apparatus, and exclude a second index from the beamforming candidate list in case in which a difference in signal to noise ratio or a difference in metric between a first index and the second index adjacent to the first index among the selected indexes is less than a beam gain.

Meanwhile, for beamforming tracking of the beam outputted by the antenna apparatus, the wireless transmission apparatus is configured to generate a beamforming candidate list including some of antenna weight vector based indexes corresponding to the region around the antenna apparatus.

Meanwhile, the wireless transmission apparatus is configured to calculate a combination of a single stream based transmission weight vector based index and a single stream reception weight vector based index, calculate a dual stream based transmission weight vector based index and a dual stream reception weight vector based index, and perform beamforming tracking after the calculation.

Meanwhile, upon the beamforming tracking, the wireless transmission apparatus is configured to transmit training data for each angle or for each sector, receives response data from the display for each angle or for each sector, calculate the signal to noise ratio or the metric based on the response data, generate the candidate list based on the signal to noise ratio or the metric, and exclude the second index from the beamforming candidate list in case in which the difference in signal to noise ratio or the difference in metric between the first index and the second index adjacent to the first index among some of the plurality of antenna based indexes is less than the beam gain.

Meanwhile, the wireless transmission apparatus incudes at least one antenna based index around the first index in the beamforming candidate list in case in which the level of the first index among the plurality of antenna based indexes is greatest.

Meanwhile, in case in which the index having the greatest level among some of the plurality of antenna based indexes is changed, the wireless transmission apparatus is configured to determine that the display or the wireless transmission apparatus rotates or moves.

Meanwhile, in case in which the index having the greatest level among some of the plurality of antenna based indexes is changed, the wireless transmission apparatus is configured to update the beamforming candidate list.

Meanwhile, in case in which the index having the greatest level among some of the plurality of antenna based indexes is changed from the first index to the second index, the wireless transmission apparatus is configured to determine that the display or the wireless transmission apparatus rotates at a predetermined angle.

Meanwhile, the wireless transmission apparatus is configured to wirelessly transmit image data for guiding the display or the antenna apparatus of the wireless transmission apparatus to rotate or move to the display in case in which a rotational angle of the display or the wireless transmission apparatus is equal to or more than a predetermined angle.

Meanwhile, in another aspect of the present disclosure, the above and other objects can be accomplished by the provision of an image display apparatus. The image display apparatus includes: a display; and a wireless transmission apparatus spaced apart from the display and configured to transmit image data to the display by a wireless communication, the wireless transmission apparatus includes at least one antenna apparatus for wirelessly transmitting the image data to the display, and for beamforming tracking of a beam outputted by the antenna apparatus, the wireless transmission apparatus is configured to generate a beamforming candidate list including some of a plurality of antenna based indexes corresponding to an area around the antenna apparatus, and updates the beamforming candidate list in case in which an index having a greatest level among some of the plurality of antenna based indexes is changed.

Meanwhile, in case in which the index having the greatest level among some of the plurality of antenna based indexes is changed from the first index to the second index, the wireless transmission apparatus is configured to determine that the display or the wireless transmission apparatus rotates at a predetermined angle.

Meanwhile, the wireless transmission apparatus is configured to wirelessly transmit the image data for guiding the display or the antenna apparatus of the wireless transmission apparatus to rotate or move to the display in case in which the index having the greatest level among some of the plurality of antenna based indexes is changed and a rotational angle of the display or the wireless transmission apparatus is equal to or more than a predetermined angle.

Meanwhile, the wireless transmission apparatus includes at least one antenna based index around the first index in the beamforming candidate list in case in which the level of the first index among the plurality of antenna based indexes is greatest.

Effects of the Disclosure

According to the embodiment of the present disclosure, the image display apparatus includes a display, and a wireless transmission apparatus spaced apart from the display and configured to transmit image data by a wireless communication, and the wireless transmission apparatus includes at least one antenna apparatus for wirelessly transmitting the image data to the display, and for beamforming tracking of a beam outputted by the antenna apparatus, the wireless transmission apparatus is configured to generate a beamforming candidate list including some of a plurality of antenna based indexes corresponding to an area around the antenna apparatus, and exclude a second index from the beamforming candidate list in case in which a difference in signal to noise ratio or a difference in metric between a first index among some of the plurality of antenna based indexes and the second index adjacent to the first index is less than a beam gain. Accordingly, rapid beamforming tracking can be performed in case in which a blocker is generated between the wireless transmission apparatus and the display disposed to be spaced apart from each other.

In particular, a valid candidate list for the beamforming tracking can be maintained. Consequently, the wireless image data transmission can be stably performed between the wireless transmission apparatus and the display disposed to be spaced apart from each other. In particular, seamless image display can be performed between the wireless transmission apparatus and the display disposed to be spaced apart from each other.

Meanwhile, the wireless transmission apparatus is configured to exclude the second index from the beamforming candidate list in case in which the difference in signal to noise ratio between the first index among some of the plurality of antenna based indexes and the second index adjacent to the first index is less than a gain of a side lobe of a beam. Accordingly, rapid beamforming tracking can be performed in case in which a blocker is generated between the wireless transmission apparatus and the display disposed to be spaced apart from each other.

Meanwhile, the wireless transmission apparatus is configured to increase the number of indexes deleted from a candidate list adjacent to the first index as a beamwidth of a main lobe of the beam increases. Accordingly, rapid beamforming tracking can be performed in case in which a blocker is generated between the wireless transmission apparatus and the display disposed to be spaced apart from each other.

Meanwhile, the wireless transmission apparatus can delete the second index adjacent to the first index from the candidate list in case in which the beamwidth of the main lobe of the beam is a first beamwidth, and delete the second index and a third index adjacent to the first index from the candidate list in case in which the beamwidth the beamwidth of the main lobe of the beam is a second beamwidth larger than the first beamwidth. Accordingly, a valid candidate list for the beamforming tracking can be maintained.

Meanwhile, the wireless transmission apparatus is configured to select indexes in case in which the signal to noise ratio or the metric is equal to or more than a reference value among a plurality of antenna based indexes for each area according to a horizontal angle and a vertical angle around the antenna apparatus, and exclude a second index from the beamforming candidate list in case in which a difference in signal to noise ratio or a difference in metric between a first index and the second index adjacent to the first index among the selected indexes is less than a beam gain. Accordingly, a valid candidate list for the beamforming tracking can be maintained.

Meanwhile, for beamforming tracking of the beam outputted by the antenna apparatus, the wireless transmission apparatus can generate a beamforming candidate list including some of antenna weight vector based indexes corresponding to the area around the antenna apparatus. Accordingly, a valid candidate list for the beamforming tracking can be maintained.

Meanwhile, the wireless transmission apparatus may calculate a combination of a single stream based transmission weight vector based index and a single stream reception weight vector based index, calculate a combination of a two stream based transmission weight vector based index and a two stream reception weight vector based index, and perform beamforming tracking after the calculation. Accordingly, the beamforming tracking may be performed.

Meanwhile, upon the beamforming tracking, the wireless transmission apparatus is configured to transmit training data for each angle or for each sector, receives response data from the display for each angle or for each sector, calculate the signal to noise ratio or the metric based on the response data, generate the candidate list based on the signal to noise ratio or the metric, and exclude a second index from a beamforming candidate list in case in which a difference in signal to noise ratio or a difference in metric between a first index and the second index adjacent to the first index among some of a plurality of antenna based indexes is less than a beam gain. Accordingly, a valid candidate list for the beamforming tracking can be maintained.

Meanwhile, the wireless transmission apparatus includes at least one antenna based index around the first index in the beamforming candidate list in case in which a level of the first index among some of the plurality of antenna based indexes is greatest. Accordingly, a valid candidate list for the beamforming tracking can be maintained.

Meanwhile, in case in which the index having the greatest level among some of the plurality of antenna based indexes is changed, the wireless transmission apparatus may determine that the display or the wireless transmission apparatus rotates or moves. Accordingly, rapid beamforming tracking may be performed in case in which at least one of the wireless transmission apparatus or the display disposed to be spaced apart from each other rotates or moves.

Meanwhile, in case in which the index having the greatest level among some of the plurality of antenna based indexes is changed, the wireless transmission apparatus may update the beamforming candidate list. Accordingly, a valid candidate list for the beamforming tracking can be maintained.

Meanwhile, in case in which the index having the greatest level among some of the plurality of antenna based indexes is changed from the first index to the second index, the wireless transmission apparatus may determine that the display or the wireless transmission apparatus rotates at a predetermined angle. Accordingly, rapid beamforming tracking may be performed in case in which at least one of the wireless transmission apparatus or the display disposed to be spaced apart from each other rotates or moves.

Meanwhile, the wireless transmission apparatus may wirelessly transmit image data for guiding the display or the antenna apparatus of the wireless transmission apparatus to rotate or move to the display in case in which a rotational angle of the display or the wireless transmission apparatus is equal to or more than a predetermined angle. Accordingly, rapid beamforming tracking may be performed in case in which at least one of the wireless transmission apparatus or the display disposed to be spaced apart from each other rotates or moves.

According to another embodiment of the present disclosure, an image display apparatus may include a display, and a wireless transmission apparatus spaced apart from the display and configured to transmit image data to the display by a wireless communication, and the wireless transmission apparatus may include at least one antenna apparatus for wirelessly transmitting the image data to the display, and for beamforming tracking of a beam outputted by the antenna apparatus, and for beamforming tacking of a beam output by the antenna apparatus, the wireless transmission apparatus may generate a beamforming candidate list including some of a plurality of antenna based indexes corresponding to an area around the antenna apparatus, and update the beamforming candidate list in case in which an index having a greatest level among some of the plurality of antenna based indexes is changed. Accordingly, rapid beamforming tracking may be performed in case in which at least one of the wireless transmission apparatus or the display disposed to be spaced apart from each other rotates or moves.

In particular, a valid candidate list for the beamforming tracking can be maintained. Consequently, the wireless image data transmission can be stably performed between the wireless transmission apparatus and the display disposed to be spaced apart from each other. In particular, seamless image display can be performed between the wireless transmission apparatus and the display disposed to be spaced apart from each other.

Meanwhile, in case in which the index having the greatest level among some of the plurality of antenna based indexes is changed from the first index to the second index, the wireless transmission apparatus may determine that the display or the wireless transmission apparatus rotates at a predetermined angle. Accordingly, rapid beamforming tracking may be performed in case in which at least one of the wireless transmission apparatus or the display disposed to be spaced apart from each other rotates or moves.

Meanwhile, the wireless transmission apparatus may wirelessly transmit image data for guiding the display or the antenna apparatus of the wireless transmission apparatus to rotate or move to the display in case in which the index having the greatest level among some of the plurality of antenna based indexes is changed and a rotational angle of the display or the wireless transmission apparatus is equal to or more than a predetermined angle. Accordingly, rapid beamforming tracking may be performed in case in which at least one of the wireless transmission apparatus or the display disposed to be spaced apart from each other rotates or moves.

Meanwhile, the wireless transmission apparatus includes at least one antenna based index around the first index in the beamforming candidate list in case in which a level of the first index among some of the plurality of antenna based indexes is greatest. Accordingly, a valid candidate list for the beamforming tracking can be maintained.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Embodiments of the present disclosure will be described below in detail with reference to the attached drawings.

The terms 'module' and 'unit' used to signify components are used herein to help the understanding of the components and thus they should not be considered as having specific meanings or roles. Accordingly, the terms 'module' and 'unit' may be used interchangeably.

Figure 1:
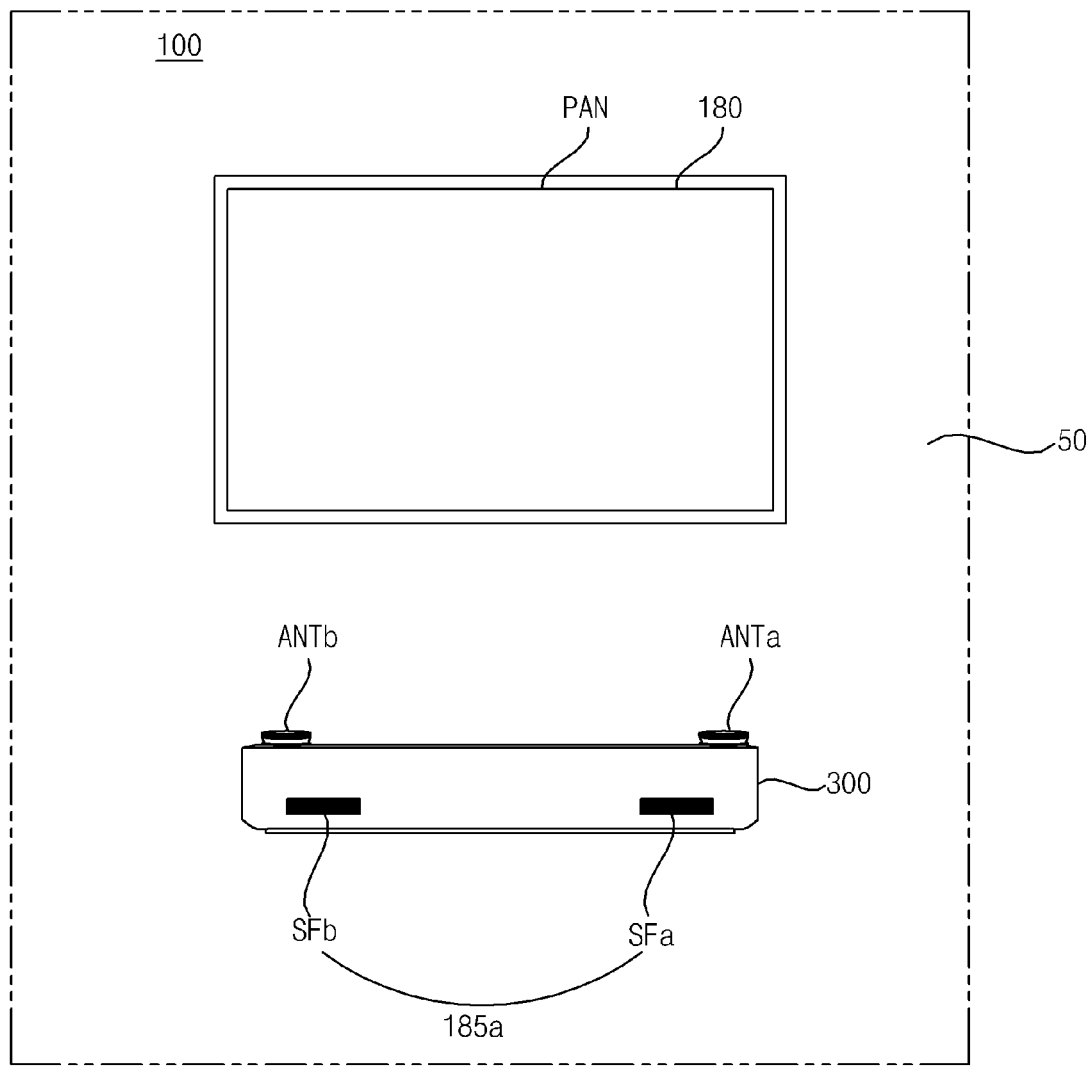
FIG. 1 is a view illustrating an image display apparatus according to an embodiment of the present disclosure.

FIG. 1 is a view illustrating an image display apparatus according to an embodiment of the present disclosure.

Referring to FIG. 1, an image display apparatus 100 according to an embodiment of the present disclosure may include a display 180 and a wireless transmission apparatus 300.

The display 180 may include a panel PAN for displaying an image. To this end, as the panel PAN, various examples including a liquid crystal display panel, an organic light emitting panel, an inorganic light emitting panel, etc. are available.

The wireless transmission apparatus 300 may be spaced apart from the display 180, and transmit a control signal by a first wireless communication scheme, and transmit image data by a second wireless communication scheme.

Here, the first wireless communication scheme may be a wireless communication scheme such as WiFi, Bluetooth, etc. For example, a frequency of several GHZ may be used. More specifically, for example, a frequency between approximately 2 G to 6 GHz may be used.

Meanwhile, the second wireless communication scheme may use a higher frequency than the first wireless communication scheme, and may be a wireless communication scheme such as WiDi, WiHD, etc. For example, a frequency of dozens of GHZ may be used. More specifically, for example, a frequency of approximately 50 GHz may be used.

Meanwhile, the wireless transmission apparatus 300 transmits the image data, so the wireless transmission apparatus 300 may also be called an AV box.

Meanwhile, the wireless transmission apparatus 300 according to an embodiment of the present disclosure may transmit a position calculation signal of the first wireless communication scheme to the display 180, receive a position calculation response signal from the display 180, and wirelessly transmit image data to the display 180 by the second wireless communication scheme according to determined beamforming based on the received position calculation response signal. Accordingly, wireless image data transmission may be stably performed between the wireless transmission apparatus 300 and the display 180 disposed to be spaced apart from each other.

Meanwhile, rapid beamforming tracking is required to maintain a stable quality between the wireless transmission apparatus 300 and the display 180.

An embodiment of the present disclosure provides a method which may perform rapid beamforming tracking in case in which a blocker is generated between the wireless transmission apparatus and the display disposed to be spaced apart from each other.

To this end, the image display apparatus 100 according to an embodiment of the present disclosure includes a display 180 and a wireless transmission apparatus 300 spaced apart from the display 180, and transmitting the image data by to the display 180 by the wireless communication scheme.

The wireless transmission apparatus 300 according to an embodiment of the present disclosure includes at least one antenna apparatus ANTa or ANTb for wirelessly transmitting the image data to the display 180.

According to an embodiment of the present disclosure, for beamforming tracking of a beam outputted by the antenna apparatus ANTa or ANTb, the wireless transmission apparatus 300 generates a beamforming candidate list including some of a plurality of antenna based indexes corresponding to an area around the antenna apparatus ANTa or ANTb, and exclude a second index from the beamforming candidate list in case in which a difference in signal to noise ratio or a difference in metric between a first index among some of the plurality of antenna based indexes and the second index adjacent to the first index is less than a beam gain.

Accordingly, rapid beamforming tracking can be performed in case in which a blocker is generated between the wireless transmission apparatus 300 and the display 180 disposed to be spaced apart from each other.

In particular, a valid candidate list for the beamforming tracking may be maintained. Accordingly, wireless image data transmission may be stably performed between the wireless transmission apparatus 300 and the display 180 disposed to be spaced apart from each other.

In particular, seamless image display may be performed between the wireless transmission apparatus 300 and the display 180 disposed to be spaced apart from each other.

Meanwhile, according to another embodiment of the present disclosure, for beamforming tracking of a beam outputted by the antenna apparatus ANTa or ANTb, the wireless transmission apparatus 300 generates a beamforming candidate list including some of a plurality of antenna based indexes corresponding to an area around the antenna apparatus ANTa or ANTb, and updates the beamforming candidate list in case in which an index having a greatest level among some of the plurality of antenna based indexes is changed.

Accordingly, rapid beamforming tracking may be performed in case in which at least one of the wireless transmission apparatus 300 or the display 180 disposed to be spaced apart from each other rotates or moves. Consequently, seamless image display may be performed between the wireless transmission apparatus 300 and the display 180 disposed to be spaced apart from each other.

Meanwhile, according to another embodiment of the present disclosure, the wireless transmission apparatus 300 may perform pairing with the display 180 by the first wireless communication scheme after power is turned on, and wirelessly transmit the image data to the display 180 by the second wireless communication scheme according to determined beamforming based on the pairing.

Accordingly, wireless image data transmission may be stably performed between the wireless transmission apparatus 300 and the display 180 disposed to be spaced apart from each other. Accordingly, seamless image display may be performed by the transmission of the wireless image data between the wireless transmission apparatus 300 and the display 180.

Meanwhile, the wireless transmission apparatus 300 may wirelessly transmit power to the display 180.

To this end, although not illustrated in FIG. 1, a plurality of bridge electrodes may be provided between the wireless transmission apparatus 300 and the display 180, and opposite electrodes facing the plurality of bridge electrodes, respectively, may be provided in the wireless transmission apparatus 300 and the display 180.

That is, wireless power transmission may be performed based on the opposite electrode of each of the wireless transmission apparatus 300 and the display 180, and capacitances between the plurality of bridge electrodes. Such a power transmission scheme may be referred to as a capacitive power transfer (CPT) scheme.

Meanwhile, the wireless transmission apparatus 300 may perform audio signal processing, and output a sound synchronized with the image displayed in the display 180.

For example, the wireless transmission apparatus 300 may include a speaker unit 185*a* that may output the sound in a front direction.

Meanwhile, each of speakers SFa and SFb which belong to a first speaker unit 185*a* may be in the front direction of the wireless transmission apparatus 300, and each array speaker which belongs to a second speaker unit (not illustrated) may be disposed at an upper side of the wireless transmission apparatus 300.

Accordingly, meanwhile, a first sound outputted from the first speaker 185*a* is outputted in a user direction, and a second sound outputted from the second speaker unit 185*a* is outputted in a ceiling direction, reflected on a ceiling, and reaches a user.

Preferably, the first sound and the second sound are output in different directions, causing no acoustic interference.

Figure 2:
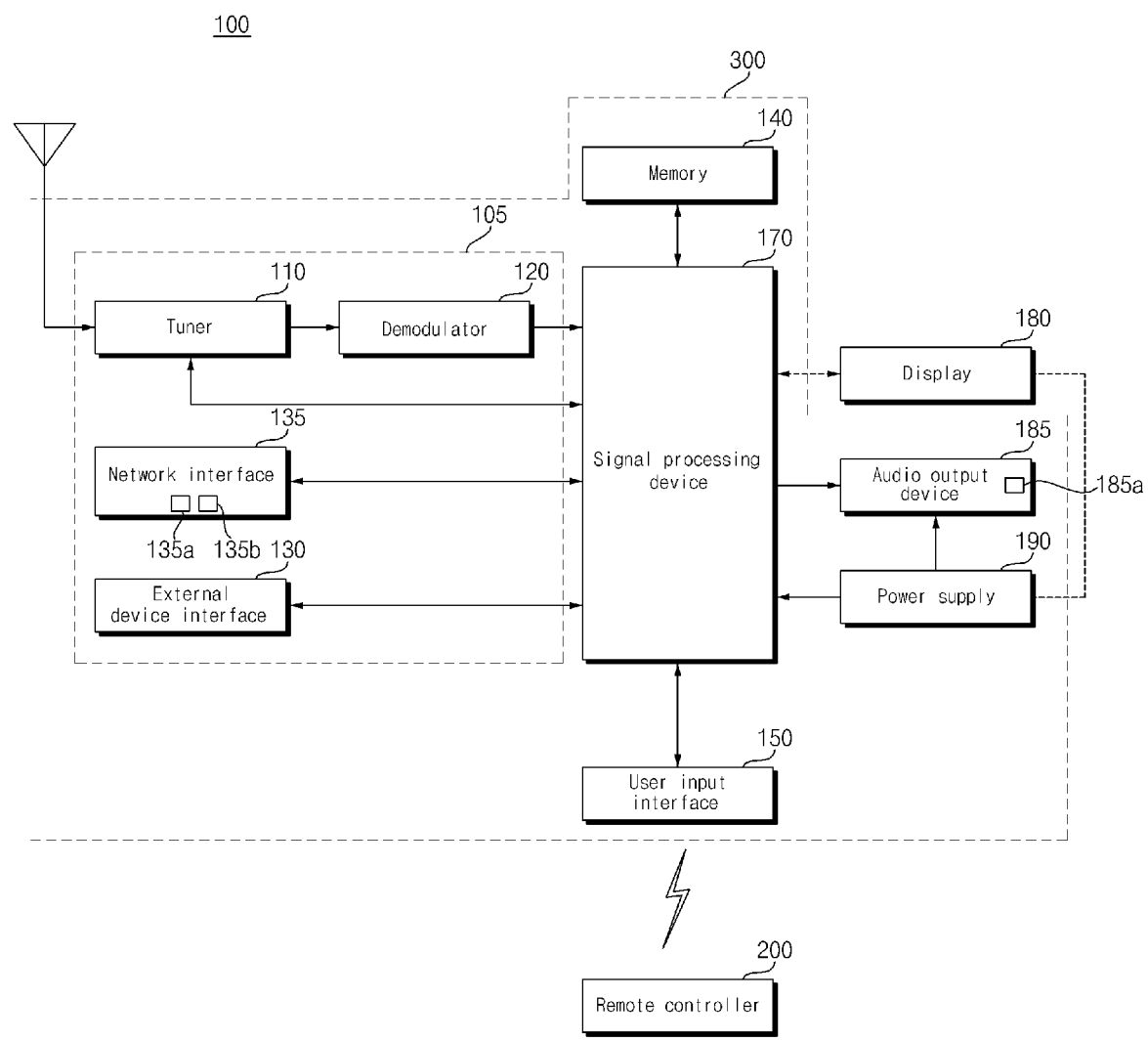
FIG. 2 is a block diagram illustrating the image display apparatus illustrated in FIG. 1.

FIG. 2 is a block diagram illustrating the image display apparatus illustrated in FIG. 1

Referring to FIG. 2, an image display apparatus 100 according to an embodiment of the present disclosure may include an image reception unit 105, a memory 140, a user input interface 150, a sensor unit (not illustrated), a signal processing device 170, a display 180, and an audio output device 185.

The image reception unit 105 may include a tuner unit 110, a demodulator 120, an external device interface 130, and a network interface 135. Of course, as necessary, it is also possible to design the image reception unit 105 not to include the network interface 135 while including the tuner unit 110 and the demodulator 120, and conversely, it is also possible to design the image reception unit 105 not to include the tuner unit 110 and the demodulator 120 while including the network interface 135.

The tuner 110 selects a Radio Frequency (RF) broadcast signal corresponding to a channel selected by a user or an RF broadcast signal corresponding to each of pre-stored channels from among a plurality of RF broadcast signals received through an antenna, and downconverts the selected RF broadcast signal into an Intermediate Frequency (IF) signal or a baseband Audio/Video (A/V) signal.

The tuner 110 may sequentially select a number of RF broadcast signals corresponding to all broadcast channels previously stored in the image display apparatus 100 by a channel add function from among a plurality of RF signals received through the antenna, and may downconvert the selected RF broadcast signals into IF signals or baseband A/V signals.

The tuner 110 may include a plurality of tuners for receiving broadcast signals of a plurality of channels, or a single tuner for simultaneously receiving broadcast signals of a plurality of channels.

The demodulator 120 receives the digital IF signal from the tuner 110 and demodulates the digital IF signal.

The demodulator 120 may perform demodulation and channel decoding on the digital IF signal, thereby obtaining a stream signal TS. The stream signal TS may be a signal in which a video signal, an audio signal and/or a data signal are multiplexed.

The stream signal may be input to the signal processing device 170 and then subjected to demultiplexing and A/V signal processing. The signal processing device 170 outputs the processed video and audio signals to the display 180 and the audio output device 185, respectively.

The external device interface 130 may transmit or receive data to and from a connected external device (not illustrated). To this end, the external device interface 130 may include an A/V input/output device (not illustrated) or a wireless transceiver (not illustrated).

The external device interface 130 may be connected to an external device, wirelessly or wiredly, such as a Digital Versatile Disk (DVD) player, a Blu-ray Disk (BD) player, a game console, a camera, a camcorder, a calculater (e.g. a laptop calculater), or a set-top box. Then, the external device interface 130 may transmit and receive signals to and from the external device.

The A/V I/O device may receive audio and video signals from an external device, and the wireless transceiver may conduct short-range wireless communication with another electronic device.

The network interface 135 serves as an interface between the image display apparatus 100 and a wired/wireless network such as the Internet. For example, the network interface 135 may receive content or data from the Internet or from a Content Provider (CP) or a Network Provider (NP) over a network.

For example, the network interface 135 may include a first transceiver 135a and a second transceiver 135b for wirelessly transmitting data to the spaced display 180.

The memory 140 may store programs necessary for the signal processing device 170 to process signals and control, and may also store a processed audio, video, or data signal.

The memory 140 may also temporarily store an audio, video or data signal received from the external device interface 130. The memory 140 may store information about broadcast channels by the channel-add function.

While the memory 140 is shown in FIG. 2 as configured separately from the signal processing device 170, to which the present disclosure is not limited, the memory 140 may be incorporated into the signal processing device 170.

The user input interface 150 transmits a signal received from the user to the signal processing device 170 or transmits a signal received from the signal processing device 170 to the user.

For example, the user input interface 150 may receive user input signals such as a power-on/off signal, a channel selection signal, and a screen setting signal from the remote controller 200, provide the signal processing device 170 with user input signals received from local keys (not shown), such as inputs of a power key, a channel key, a volume key, and a setting value, transmit a user input signal received from the sensor device (not shown) that senses a user gesture to the signal processing device 170, or transmit a signal received from the signal processing device 170 to the sensor device.

The signal processing device 170 may demultiplex a stream signal received from the tuner 110, the demodulator 120, or the external device interface 130 into a number of signals, and process the demultiplexed signals into audio and video signals.

An image signal image-processed by the signal processing device 170 may be inputted into the display 180, and displayed as an image corresponding to the image signal. Further, the image signal image-processed by the signal processing device 170 may be outputted to the outside through the external device interface 130 or the network interface 135.

A voice signal processed by the signal processing device 170 may be sound-outputted to the audio output device 185. Further, the voice signal image-processed by the signal processing device 170 may be outputted to the outside through the external device interface 130 or the network interface 135.

While not shown in FIG. 2, the signal processing device 170 may include a demultiplexer and a video processor, which will be described later with reference to FIG. 3.

In addition, the signal processing device 170 may provide overall control to the image display apparatus 100. For example, the signal processing device 170 may control the tuner 110 to select an RF broadcast signal corresponding to a user-selected channel or a pre-stored channel.

The signal processing device 170 may control the image display apparatus 100 according to a user command received through the user input interface 150 or according to an internal program.

The signal processing device 170 may control the display 180 to display an image. The image displayed on the display 180 may be a Two-Dimensional (2D) or Three-Dimensional (3D) still image or video.

The signal processing device 170 may locate the user based on an image captured by a camera device (not shown). For example, the signal processing device 170 may determine the distance (a z-axis coordinate) between the user and the image display apparatus 100. In addition, the signal processing device 170 may determine x-axis and y-axis coordinates corresponding to the position of the user on the display 180.

The display 180 generates drive signals by converting a processed video signal, a processed data signal, an On Screen Display (OSD) signal, and a control signal received from the signal processing device 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 may also be a 3D display.

The display 180 may also be a touch screen that can be used not only as an output device but also as an input device.

The audio output device 185 may receive a processed audio signal from the signal processing device 170 and output the received audio signal as voice.

Meanwhile, the audio output device 185 may include the first speaker unit 185a and the second speaker unit (not illustrated). In this case, the second speaker unit (not illustrated) may include an array speaker including a plurality of speakers.

A camera device (not shown) captures a user. The camera device may include, but not limited to, a single camera. When needed, the camera device may include a plurality of cameras. The camera device may be embedded on the display 180 in the image display apparatus 100, or may be separately configured. Image information captured by the camera device may be provided to the signal processing device 170.

The signal processing device 170 may sense a user's gesture from a captured image received from the camera device or from signals received from the sensor device (not shown) alone or in combination.

The power supply 190 supplies power across the whole image display apparatus 100. Particularly, the power supply 190 may supply power to the signal processing device 170 which may be implemented as a System On Chip (SOC), the display 180 for displaying an image, and the audio output device 185 for outputting an audio signal.

Specifically, the power supply 190 may include a converter to convert Alternating Current (AC) power to Direct Current (DC) power, and a DC/DC converter to convert the level of DC power.

The remote controller 200 transmits a user input to the user input interface 150. For the transmission of a user input, the remote controller 200 may operate based on various communication standards such as Bluetooth, RF communication, IR communication, Ultra WideBand (UWB), and ZigBee. In addition, the remote controller 200 may receive a video signal, an audio signal and/or a data signal from the user input interface 150 and may output the received signal as an image or sound.

The above-described image display apparatus 100 may be a fixed or mobile digital broadcast receiver.

The block diagram of the image display apparatus 100 illustrated in FIG. 2 is an exemplary embodiment of the present disclosure. The image display apparatus 100 is shown in FIG. 2 as having a number of components in a given configuration. However, the image display apparatus 100 may include fewer components or more components than those shown in FIG. 2. Also, two or more components of the image display apparatus 100 may be combined into a single component or a single component thereof may be separated into two more components. The functions of the components of the image display apparatus 100 as set forth herein are illustrative in nature and may be modified, for example, to meet the requirements of a given application.

Figure 3:
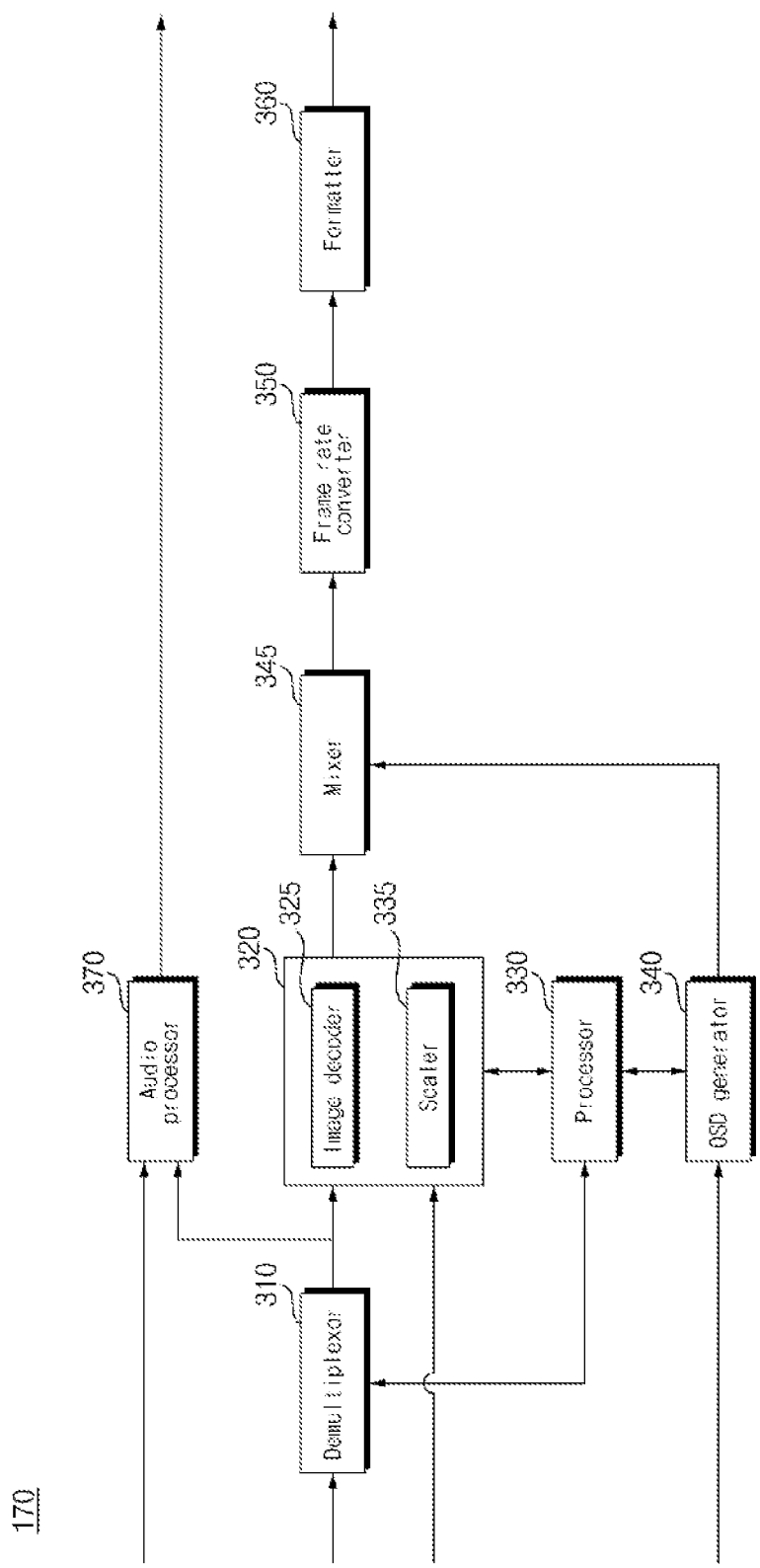
FIG. 3 is a block diagram illustrating a signal processing device illustrated in FIG. 2.

FIG. 3 is a block diagram illustrating a signal processing device illustrated in FIG. 2

Referring to FIG. 3, the signal processing device 170 may include a demultiplexor 310, a video processor 320, a processor 330, an OSD generator 340, a mixer 345, a Frame Rate Converter (FRC) 350, and a formatter 360 according to an embodiment of the present invention. The signal processing device 170 may further include an audio processor 370 and a data processor (not shown).

The demultiplexor 310 demultiplexes an input stream. For example, the demultiplexor 310 may demultiplex an MPEG-2 TS into a video signal, an audio signal, and a data signal. The input stream signal may be received from the tuner 110, the demodulator 120, or the external device interface 130.

The video processor 320 may process the demultiplexed video signal. For video signal processing, the video processor 320 may include an image decoder 325 and a scaler 335.

The image decoder 325 decodes the demultiplexed video signal and the scaler 335 scales the resolution of the decoded video signal so that the video signal may be displayed on the display 180.

The image decoder 325 may be provided with decoders that operate in conformance to various standards.

The processor 330 may provide overall control to the image display apparatus 100 or the signal processing device 170. For example, the processor 330 may control the tuner 110 to tune to an RF broadcasting corresponding to a user-selected channel or a pre-stored channel.

The processor 330 may also control the image display apparatus 100 according to a user command received through the user input interface 150 or an internal program.

The processor 330 may control data transmission through the network interface 135 or the external device interface 130.

The processor 330 may control operations of the demultiplexor 310, the video processor 320, and the OSD generator 340 in the signal processing device 170.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, and icons.

Further, the OSD generator 340 may generate a pointer to be displayed on the display 180 based on a pointing signal received from the remote controller 200. Especially, the pointer may be generated from a pointing signal processor (not shown), which may reside in the OSD generator 340. Obviously, the pointing signal processor may be configured separately from the OSD generator 240.

The mixer 345 may mix the decoded video signal processed by the video processor 320 with the OSD signal generated from the OSD generator 340.

The FRC 350 may change the frame rate of an input video signal or simply output the video signal without frame rate conversion.

The formatter 360 may convert a received signal to a video signal to be provided to the display 180. For example, the formatter 360 may convert the received signal into a Low Voltage Differential Signal (LVDS) or mini-LVDS.

The audio processor 370 of the signal processing device 170 may process the demultiplexed audio signal, or an audio signal of specific content. For the audio signal processing, the audio processor 370 may have a plurality of decoders.

The audio processor 370 of the signal processing device 170 may also adjust the bass, treble, and volume of the audio signal.

The data processor (not shown) of the signal processing device 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

The block diagram of the signal processing device 170 illustrated in FIG. 3 is purely exemplary. Depending upon the specifications of the signal processing device 170 in actual implementation, the components of the signal processing device 170 may be combined or omitted or new components may be added.

Especially, the FRC 350 and the formatter 360 may be configured as separate modules or as a single module, outside the signal processing device 170.

Figure 4A:
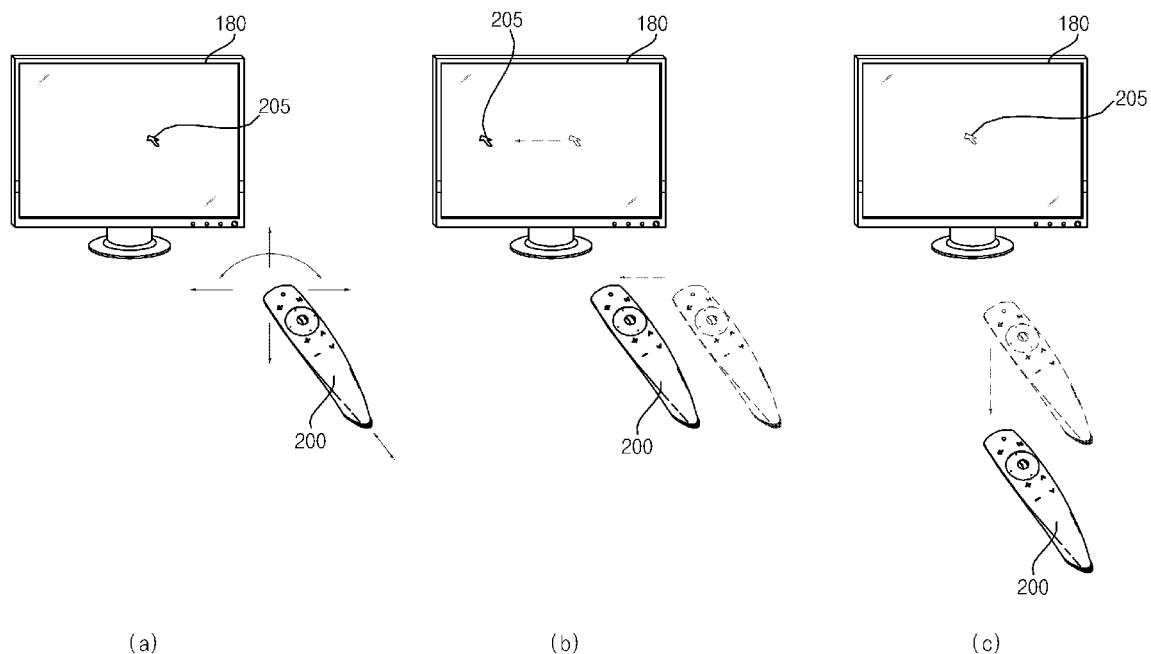
FIG. 4A is a view illustrating a method for controlling a remote controller illustrated in FIG. 2.

FIG. 4A illustrates a method for controlling the remote controller illustrated in FIG. 2.

(a) of FIG. 4A illustrates a pointer 205 representing movement of the remote controller 200, displayed on the display 180.

The user may move or rotate the remote controller 200 up and down, side to side ((b) of FIG. 4A), and back and forth ((c) of FIG. 4A). The pointer 205 displayed on the display 180 corresponds to movement of the remote controller 200. Since the pointer 205 moves in accordance with the movement of the remote controller 200 in a 3D space, the remote controller 200 may be referred to as a spatial remote controller or a 3D pointing device.

Referring to (b) of FIG. 4A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may determine the movement of the remote controller 200 based on the motion information received from the remote controller 200, and calculate the coordinates of a target point to which the pointer 205 should be shifted in accordance with the movement of the remote controller 200 based on the result of the determination. The image display apparatus then displays the pointer 205 at the calculated coordinates.

Referring to (c) of FIG. 4A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, in case in which the remote controller 200 moves away from the display 180, the selection area may be zoomed out and in case in which the remote controller 200 approaches the display 180, the selection area may be zoomed in.

With the predetermined button pressed in the remote controller 200, the up, down, left and right movements of the remote controller 200 may be ignored. That is, in case in which the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4B:
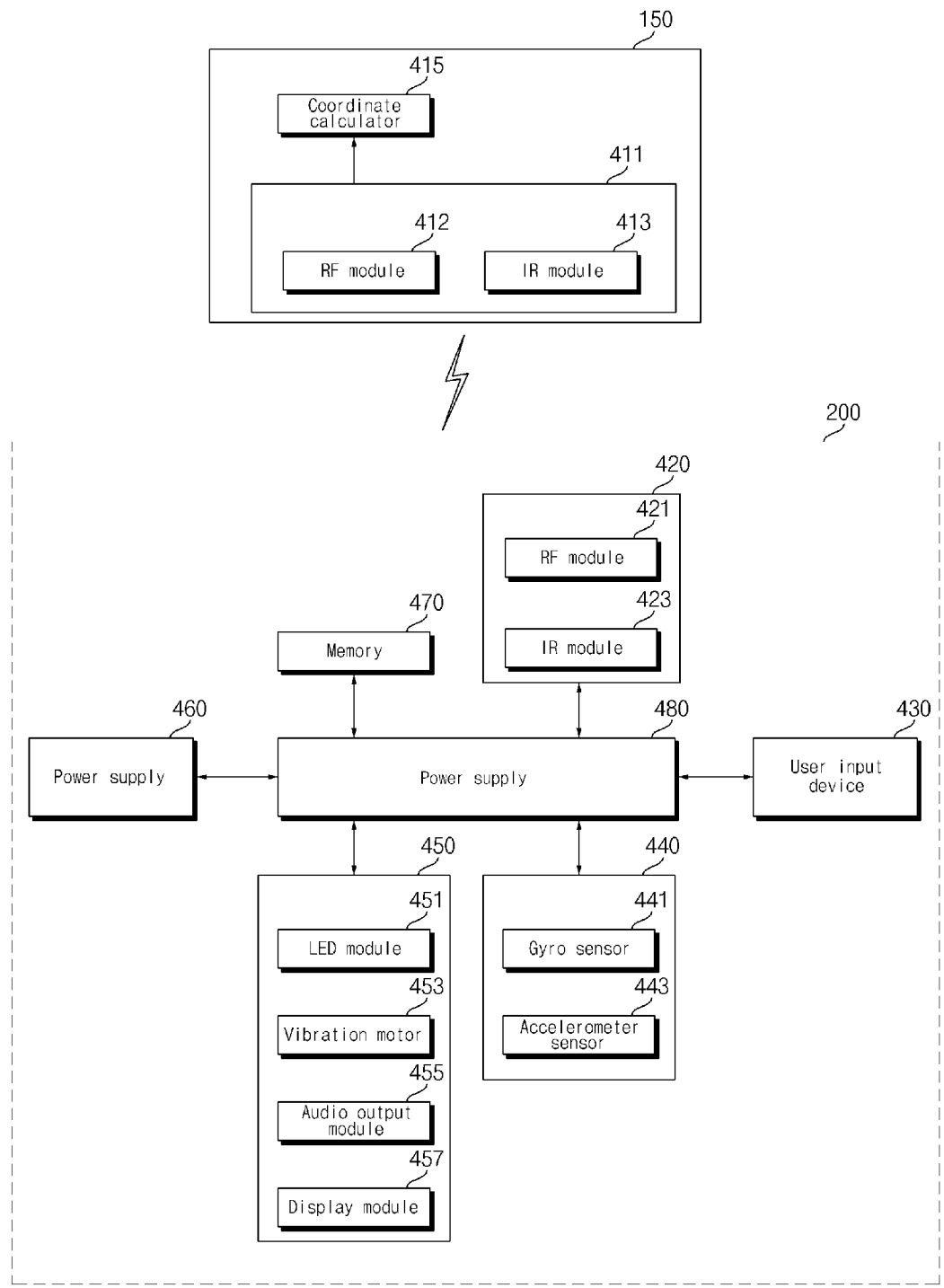
FIG. 4B is a block diagram illustrating the remote controller illustrated in FIG. 2.

FIG. 4B is a block diagram of the remote controller illustrated in FIG. 2.

Referring to FIG. 4B, the remote controller 200 may include a wireless communication module 420, a user input device 430, a sensor device 440, an output device 450, a power supply 460, a memory 470, and a signal processing device 480.

The wireless communication module 420 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the wireless communication module 420 may include an RF module 421 for transmitting RF signals to and/or receiving RF signals from the image display apparatus 100 according to an RF communication standard. Further, the wireless communication module 420 may include an IR module 423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 421.

Further, the remote controller 200 may receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input device 430 may include a keypad, a plurality of buttons, a touch pad, or a touch screen. The user may enter commands to the image display apparatus 100 by manipulating the user input device 430. If the user input device 430 includes a plurality of hard-key buttons, the user may input various commands to the image display apparatus 100 by pressing the hard-key buttons. If the user input device 430 includes a touch screen displaying a plurality of soft keys, the user may input various commands to the image display apparatus 100 by touching the soft keys. The user input device 430 may also include various input tools other than those set forth herein, such as a scroll key and/or a jog key, which should not be construed as limiting the present disclosure.

The sensor device 440 may include a gyro sensor 441 and/or an acceleration sensor 443. The gyro sensor 441 may sense the movement of the remote controller 200.

For example, the gyro sensor 441 may sense motion information about the remote controller 200 in X-, Y-, and Z-axis directions. The acceleration sensor 443 may sense the moving speed of the remote controller 200. The sensor device 440 may further include a distance sensor for sensing the distance between the remote controller 200 and the display 180.

The output device 450 may output a video and/or audio signal corresponding to a manipulation of the user input device 430 or a signal transmitted by the image display apparatus 100. The user may easily identify whether the user input device 430 has been manipulated or whether the image display apparatus 100 has been controlled based on the video and/or audio signal output from the output device 450.

For example, the output device 450 may include an LED module 451 which is turned on or off whenever the user input device 430 is manipulated or whenever a signal is received from or transmitted to the image display apparatus 100 through the wireless communication module 420, a vibration module 453 which generates vibrations, an audio output module 455 which outputs audio data, or a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The signal processing device 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The signal processing device 480 provides overall control to the remote controller 200. For example, the signal processing device 480 may transmit a signal corresponding to a key manipulation detected from the user input device 430 or a signal corresponding to motion of the remote controller 200, as sensed by the sensor device 440, to the image display apparatus 100 through the wireless communication module 420.

The user input interface 150 of the image display apparatus 100 may include a wireless communication module 411 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 412. In addition, the user input interface 150 may wirelessly receive IR signals from the remote controller 200 through an IR module 413 according to the IR communication standard.

The coordinate calculator 415 may receive motion information regarding the movement of the remote controller 200 through the wireless communication module 411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the signal processing device 170. Then, the signal processing device 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the signal processing device 170.

In a further example, unlike the configuration of the remote controller 200 illustrated in FIG. 4B, the coordinate calculator 415 may reside in the signal processing device 170, instead of the user input interface 150.

Figure 5:
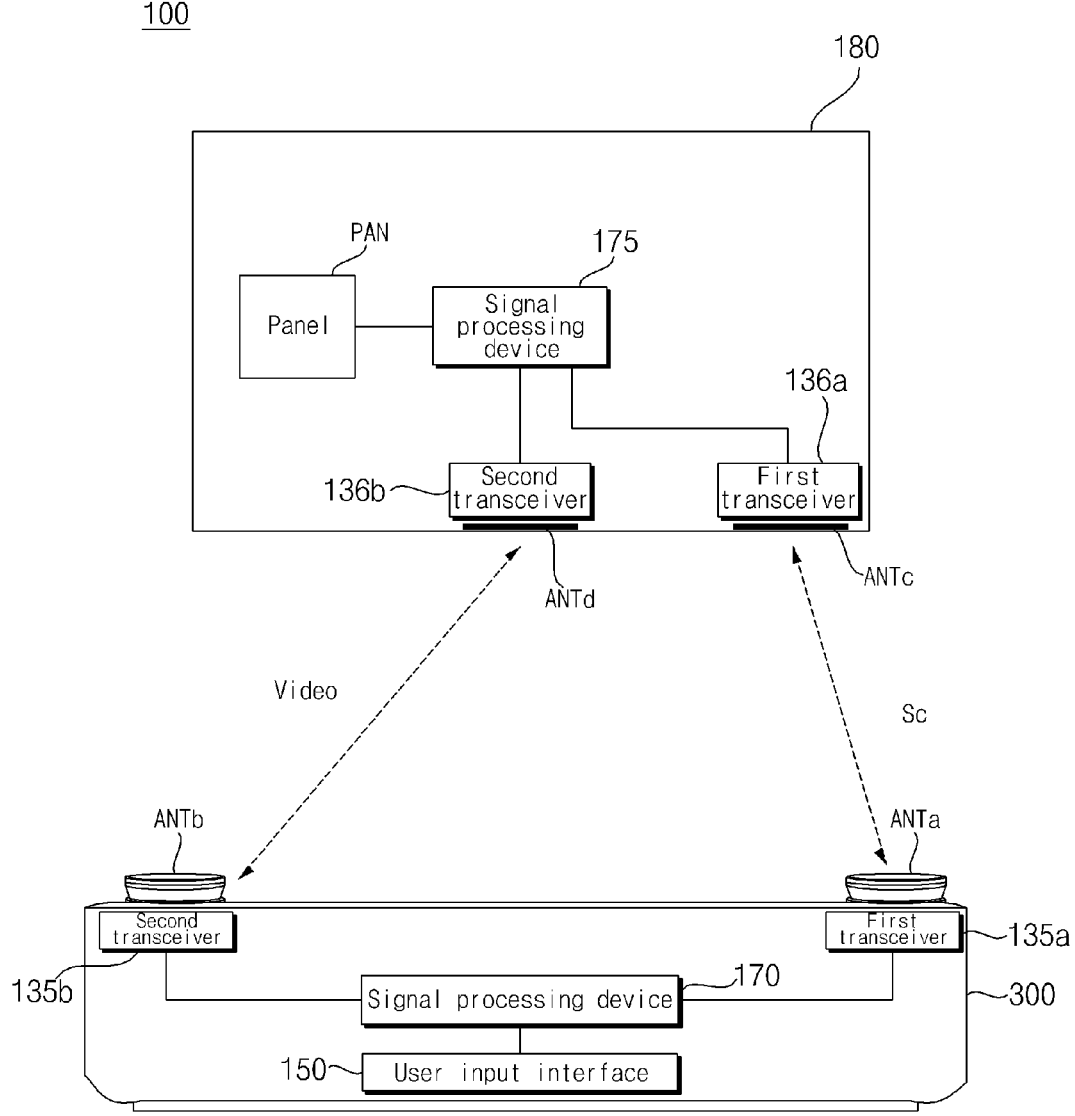
FIG. 5 illustrates one example of an internal block diagram of a wireless transmission apparatus and a display of FIG. 1.

FIG. 5 illustrates one example of an internal block diagram of a wireless transmission apparatus and a display of FIG. 1.

Referring to FIG. 5, the wireless transmission apparatus 300 may include an interface 150 receiving a signal from a remote controller 200, a first transceiver 135a performing wireless communication with the display 180 based on the first communication scheme, a second transceiver 135b transmitting image data to the display 180 based on the second communication scheme, and a signal processing device 170 controlling the first transceiver 135a and the second transceiver 135b.

Meanwhile, the first transceiver 135a may include a first antenna apparatus ANTa including a plurality of antenna elements and the second transceiver 135b may include a second antenna apparatus ANTb including the plurality of antenna elements.

Meanwhile, the display 180 may include a first transceiver 136a performing wireless communication with the wireless transmission apparatus 300 based on the first communication scheme, a second transceiver 135b receiving the image data from the wireless communication apparatus 300 based on the second communication scheme, a panel PAN displaying the image data, and a signal processing device 175 controlling the first transceiver 136a and the second transceiver 135b.

Meanwhile, the first transceiver 136a may include a first antenna apparatus ANTc including the plurality of antenna elements and the second transceiver 136b may include a second antenna apparatus ANTd including the plurality of antenna elements.

Meanwhile, the signal processing device 170 of the wireless transmission apparatus 300 may perform control to transmit a position calculation signal of the first wireless communication scheme to the display 180, receive a position calculation response signal from the display 180, and wirelessly transmit the image data to the display 180 by the second wireless communication scheme according to determined beamforming based on the received position calculation response signal.

Specifically, in case in which the first transceiver 135a of the wireless transmission apparatus 300 transmits the position calculation signal, the first transceiver 136a of the display 180 receives the position calculation signal. In addition, the first transceiver 136a of the display 180 transmits a position calculation response signal in response to the position calculation signal.

Accordingly, the first transceiver 135a of the wireless transmission apparatus 300 may receive the position calculation response signal.

In addition, the signal processing device 170 of the wireless transmission apparatus 300 may perform control to calculate positional information of the display 180 based on the position calculation response signal, and determine the beamforming based on the calculated positional information.

Here, the positional information may include distance information, angle information, etc., of the display 180.

In addition, the signal processing device 170 of the wireless transmission apparatus 300 may perform control to wirelessly transmit the image data to the display 180 by the second wireless communication scheme according to the determined beamforming, specifically, a determined beamforming angle, a determined beamforming intensity, etc.

Accordingly, the second transceiver 135b of the wireless transmission apparatus 300 transmits the image data, and the second transceiver 136b of the display 180 receives the image data.

In addition, the signal processing device 175 of the display 180 controls the received image data to be displayed in the panel PAN.

Consequently, the beamforming is determined based on the second wireless communication scheme that transmits the image data, and the beamforming is determined based on the first wireless communication scheme for control signal transmission not related to the image data to rapidly and stably perform wireless image data transmission between the wireless transmission apparatus 300 and the display 180.

Accordingly, seamless image display may be performed by the transmission of the wireless image data between the wireless transmission apparatus 300 and the display 180.

Meanwhile, the signal processing device 170 of the wireless transmission apparatus 300 may perform control to stop transmission of the image data to the display 180 in case in which the position calculation response signal deviates from a tolerance.

Meanwhile, the signal processing device 170 of the wireless transmission apparatus 300 may perform control to transmit the position calculation signal of the first wireless communication scheme to the display 180 in case in which a transmission rate of the image data to the display 180 is equal to or less than a predetermined value.

Meanwhile, the signal processing device 170 of the wireless transmission apparatus 300 may perform control to perform pairing with the display 180 by the first communication scheme after power is turned on, and then transmit the position calculation signal of the first wireless communication scheme to the display 180.

Meanwhile, the signal processing device 170 of the wireless transmission apparatus 300 may perform control to adjust an angle of the antenna (ANT of FIG. 11B) outputting the image data or vary a phase of a signal applied to the antenna (ANT of FIG. 11B) based on the determined beamforming. Accordingly, a transmission angle of the beam upon transmitting the image data is varied.

Meanwhile, the signal processing device 170 of the wireless transmission apparatus 300 may be powered on based on a power-on signal received from the remote controller 200, and may perform control to transmit the power-on signal to the display 180 after power is turned on, and perform the pairing with the display 180 by the first communication scheme.

Unlike this, the display 180 may receive the power-on signal received from the remote controller 200, and the display 180 may be powered on based on the power-on signal received from the remote controller 200, and may transmit the power-on signal to the wireless transmission apparatus 300 after the power-on.

In response thereto, the signal processing device 170 of the wireless transmission apparatus 300 may be powered on based on the power-on signal from the display 180, and may perform control to perform the pairing with the display 180 by the first communication scheme after the power-on.

Meanwhile, the signal processing device 170 of the wireless transmission apparatus 300 may perform control to generate a pointer image based on a pointing signal from the remote controller 200, add the generated pointer image to the image data, and transmit the image data to which the pointer image is added to the display 180.

Accordingly, the image data to which the pointer image is added may be displayed in the display 180.

Meanwhile, the signal processing device 170 of the wireless transmission apparatus 300 may perform control to stop transmission of the image data to the previous display 180, and transmit the position calculation signal of the first wireless communication scheme to the display 180 in case in which the transmission rate of the image data to the display 180 is equal to or less than a predetermined value.

Meanwhile, the signal processing device 170 of the wireless transmission apparatus 300 may perform control to wirelessly transmit power to the display 180.

Meanwhile, the signal processing device 170 of the wireless transmission apparatus 300 may perform control to vary a resolution of the image data transmitted to the display 180 according to the transmission rate of the image data to the display 180.

For example, it may be controlled so that the higher the transmission rate of the image rate, the higher the resolution of the image data transmitted to the display, and the lower the transmission rate of the image data, the lower the resolution of the image data transmitted to the display 180.

Meanwhile, the signal processing device 170 of the wireless transmission apparatus 300 may perform control to stop transmission of the image data to the display 180, and transmit the position calculation signal of the first wireless communication scheme to the display 180 in case in which the transmission rate of the image data to the display 180 is equal to or less than a predetermined value.

Meanwhile, the signal processing device 170 of the wireless transmission apparatus 300 may also perform control to transmit a pairing signal for pairing with the display 180, receive a pairing response signal from the display 180, calculate the positional information of the display 180 based on the pairing response signal, and determine beamforming based on the calculated positional information.

That is, the position calculation signal may be replaced with the pairing signal, and the position calculation response signal may also be replaced with the pairing response signal.

Figure 6A:
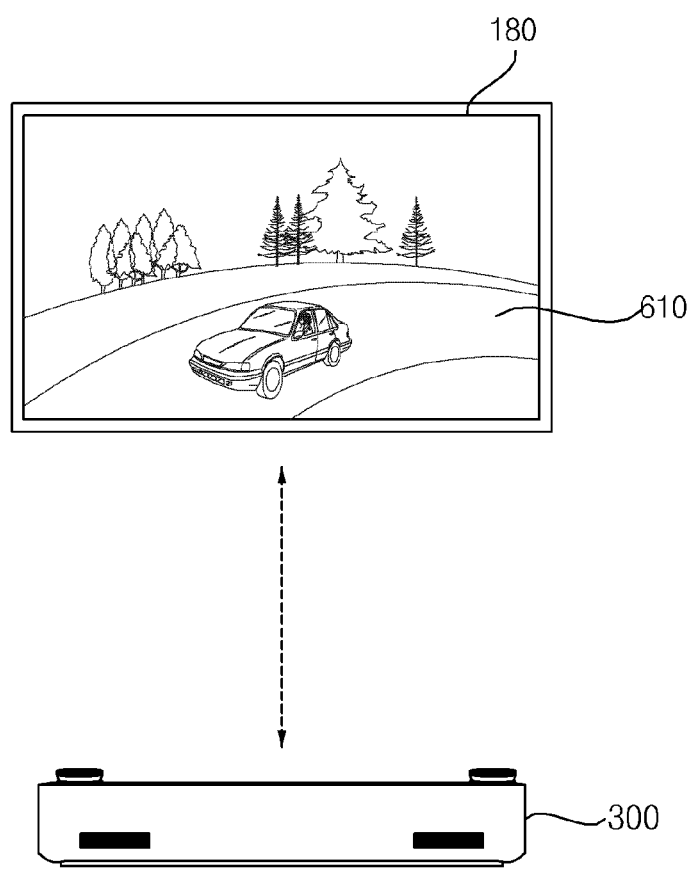
FIGS. 6A and 6B are views for describing a case where there is a blocker between the wireless transmission apparatus and the display.
Figure 6B:
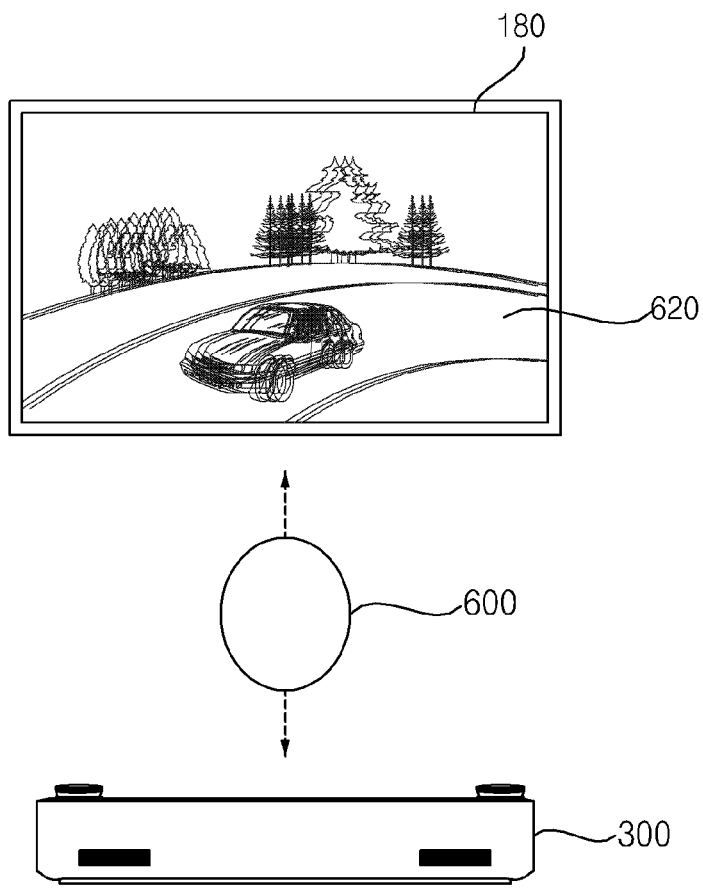

FIGS. 6A and 6B are views for describing a case where there is a blocker between the wireless transmission apparatus and the display.

Referring to FIGS. 6A and 6B, FIG. 6A illustrates that there is no blocker 600 between the wireless transmission apparatus 300 and the display 180, and an image 160 is stably displayed in the display 180.

FIG. 6B illustrates that the blocker 600 is positioned between the wireless transmission apparatus 300 and the display 180, and as a result, noise is generated in the beam transmitted by the wireless transmission apparatus 300, so the noise is displayed in the image 620 displayed in the display 180.

An embodiment of the present disclosure provides a method for performing rapid beamforming tracking in case in which there is the blocker 600. This will be described below with reference to FIG. 8 or below.

Figure 7A:
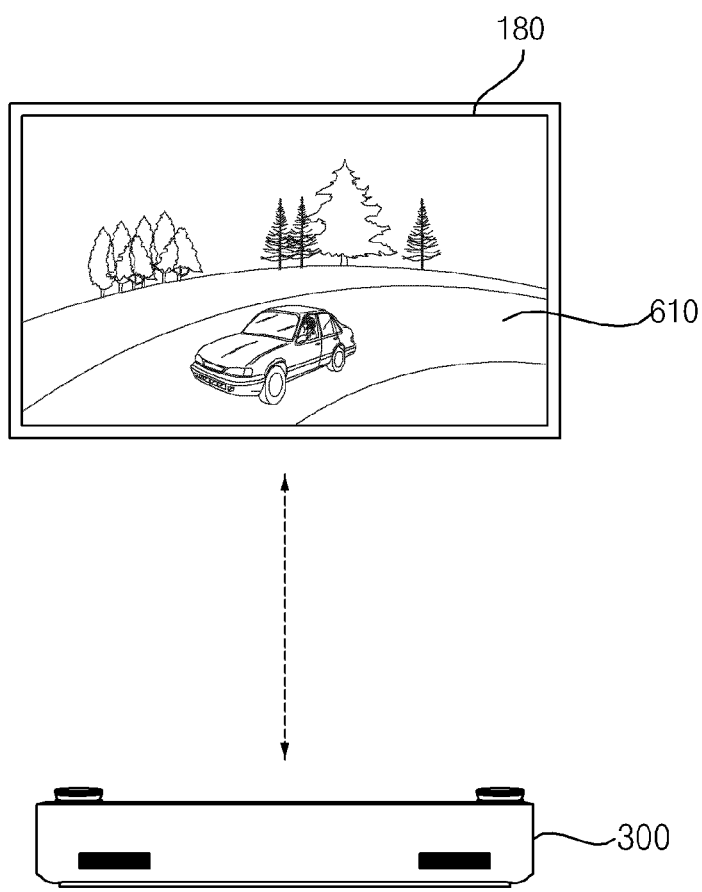
FIGS. 7A and 7B are views for describing movement of the wireless transmission apparatus.
Figure 7B:
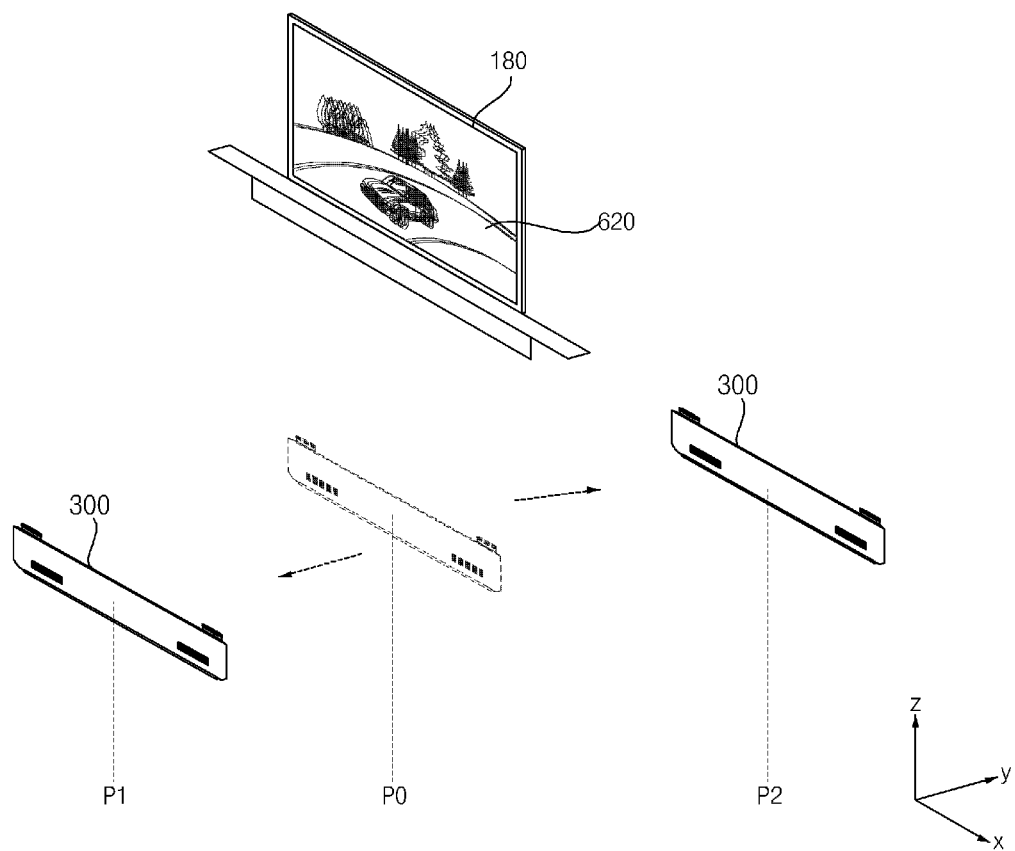

FIGS. 7A and 7B are views for describing movement of the wireless transmission apparatus.

Referring to FIGS. 7A and 7B, FIG. 7A illustrates that an image 610 is stably displayed in the display 180 without positional movement or angle movement of both the wireless transmission apparatus 300 and the display 180.

FIG. 7B illustrates that the wireless transmission apparatus 300 among the wireless transmission apparatus 300 and the display 180 moves from a position P0 to a position P1 which is a front or to a position P2 which is a right surface.

Due to the positional movement, beamformings of the beams outputted by the antenna apparatus ANTa and ANTb are shifted, so the noise may be displayed in the image 620 displayed in the display 180.

Another embodiment of the present disclosure provides a method for performing rapid beamforming tracking in case in which the wireless transmission apparatus 300 or the display 180 moves or rotates. This will be described below with reference to FIG. 9 or below.

Figure 8:
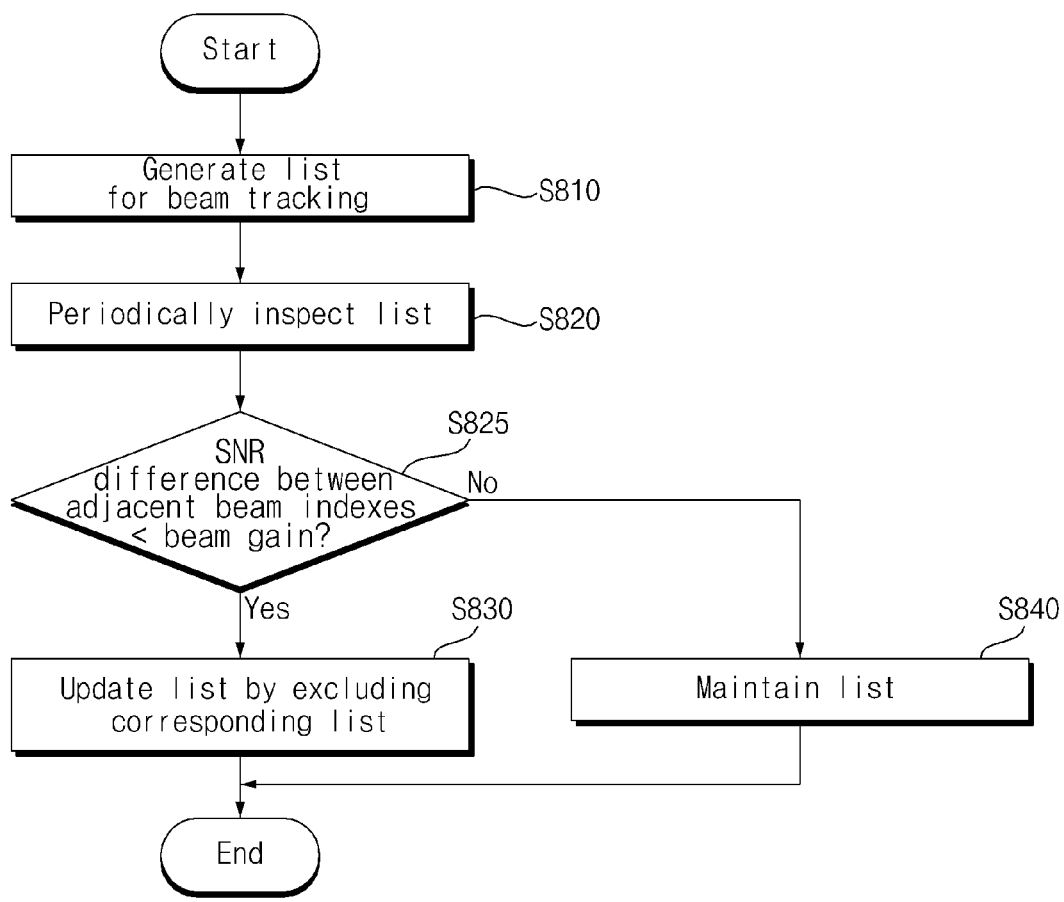
FIG. 8 is a flowchart illustrating one example of an operation method of an image display apparatus according to an embodiment of the present disclosure.

FIG. 8 is a flowchart illustrating one example of an operation method of an image display apparatus according to an embodiment of the present disclosure.

Referring to FIG. 8, the wireless transmission apparatus 300 generates a beamforming candidate list for beamforming tracking of the beams outputted by the antenna apparatuses ANTa and ANTb (S810).

The beamforming candidate list may include some of a plurality of antenna based indexes corresponding to an area around the antenna apparatuses ANTa and ANTb.

Specifically, for beamforming tracking of the beams outputted by the antenna apparatuses ANTa and ANTb, the wireless transmission apparatus 300 may generate a beamforming candidate list including some of antenna weight vector (AWV) based indexes corresponding to the area around the antenna apparatus.

Meanwhile, upon the beamforming tracking, the wireless transmission apparatus 300 may transmit training data for each angle or for each sector, receive response data from the display 180 for each angle or for each sector, calculate a signal to noise ratio or a metric based on response data, and generate a candidate list based on the signal to noise ratio or the metric.

Meanwhile, before generating the beamforming candidate list, the wireless transmission apparatus 300 may calculate a combination of a single stream based transmission weight vector based index and a single stream reception weight vector based index.

In particular, the wireless transmission apparatus 300 may calculate a combination of a transmission weight vector based index and a reception weight vector based index capable of receiving a single stream based control-mode packet. Such a mode may be called a sector level sweep (SLS) mode.

Next, the wireless transmission apparatus 300 may calculate a combination of a two stream based transmission weight vector based index and a two stream based transmission weight vector based index.

In particular, the wireless transmission apparatus 300 may calculate a combination of a transmission weight vector based index and a reception weight vector based index capable of maximizing data transmission of a two stream based SC-mode packet. Such a mode may be called a multiple-input multiple-output beamforming (MIMO BF) mode.

In addition, after the calculation, the wireless transmission apparatus 300 may perform the beamforming tracking. In particular, the wireless transmission apparatus 300 may periodically inspect signal qualities of candidate lists generated in an MIMO BF phase, and change an AWV index in case in which the signal qualities are better than an AWV index combination used for data transmission. Such a mode may be called a data transfer mode.

Next, the wireless transmission apparatus 300 may periodically inspect the beamforming candidate list (S820).

Next, the wireless transmission apparatus 300 determines whether a difference in signal to noise ratio or a difference in metric between a first index among some of a plurality of antenna based indexes and a second index adjacent to the first index is less than a beam gain (S825), and exclude the second index from the beamforming candidate list (S830).

Accordingly, rapid beamforming tracking may be performed in case in which a blocker is generated between the wireless transmission apparatus 300 and the display 180 disposed to be spaced apart from each other. In particular, a valid candidate list for the beamforming tracking can be maintained.

Meanwhile, the wireless transmission apparatus 300 may exclude the second index from the beamforming candidate list in case in which the difference in signal to noise ratio between the first index among some of the plurality of antenna based indexes and the second index adjacent to the first index is less than a gain of a side lobe of a beam.

Meanwhile, the wireless transmission apparatus 300 may increase the number of indexes deleted from a candidate list adjacent to the first index as a beamwidth of a main lobe of the beam increases.

Meanwhile, the wireless transmission apparatus 300 may delete the second index adjacent to the first index from the candidate list in case in which the beamwidth of the main lobe of the beam is a first beamwidth, and delete the second index and a third index adjacent to the first index from the candidate list in case in which the beamwidth the beamwidth of the main lobe of the beam is a second beamwidth larger than the first beamwidth. Accordingly, a valid candidate list for the beamforming tracking may be maintained.

Meanwhile, the wireless transmission apparatus 300 may select indexes in case in which the signal to noise ratio or the metric is equal to or more than a reference value among a plurality of antenna based indexes for each area according to a horizontal angle and a vertical angle around the antenna apparatuses ANTa and ANTb, and exclude a second index from the beamforming candidate list in case in which a difference in signal to noise ratio or a difference in metric between a first index and the second index adjacent to the first index among the selected indexes is less than a beam gain.

Meanwhile, the wireless transmission apparatus 300 may exclude, in case in which a difference in signal to noise ratio or a difference in metric between the first index among some of the plurality of antenna based indexes and the second index adjacent to the first index is less than the beam gain, the second index from the beamforming candidate list. Accordingly, a valid candidate list for the beamforming tracking can be maintained.

Meanwhile, the wireless transmission apparatus 300 includes at least one antenna based index around the first index in the beamforming candidate list in case in which a level of the first index among some of the plurality of antenna based indexes is greatest. Accordingly, a valid candidate list for the beamforming tracking may be maintained.

Meanwhile, in case in which the index having the greatest level among some of the plurality of antenna based indexes is changed, the wireless transmission apparatus 300 may determine that the display 180 or the wireless transmission apparatus 300 rotates or moves. Accordingly, rapid beamforming tracking may be performed in case in which at least one of the wireless transmission apparatus 300 or the display 180 disposed to be spaced apart from each other rotates or moves.

Meanwhile, in case in which the index having the greatest level among some of the plurality of antenna based indexes is changed, the wireless transmission apparatus 300 may update the beamforming candidate list. Accordingly, a valid candidate list for the beamforming tracking may be maintained.

Meanwhile, in case in which the index having the greatest level among some of the plurality of antenna based indexes is changed from the first index to the second index, the wireless transmission apparatus 300 may determine that the display 180 or the wireless transmission apparatus 300 rotates at a predetermined angle. Accordingly, rapid beamforming tracking may be performed in case in which at least one of the wireless transmission apparatus 300 or the display 180 disposed to be spaced apart from each other rotates or moves.

Meanwhile, the wireless transmission apparatus 300 may wirelessly transmit image data for guiding the display 180 or the antenna apparatus of the wireless transmission apparatus 300 to rotate or move to the display 180 in case in which a rotational angle of the display 180 or the wireless transmission apparatus 300 is equal to or more than a predetermined angle. Accordingly, rapid beamforming tracking may be performed in case in which at least one of the wireless transmission apparatus 300 or the display 180 disposed to be spaced apart from each other rotates or moves.

In step S825, the wireless transmission apparatus 300 may determine whether the difference in signal to noise ratio or the difference in metric between the first index among some of the plurality of antenna based indexes and the second index adjacent to the first index is less than the beam gain (S825), and if not, continuously maintain the beamforming candidate list generated in step S810 (S840).

Meanwhile, the wireless transmission apparatus 300 may determine whether the antenna weight vector is included in a candidate group sequentially in antenna weight vector combinations arranged by a metric (capacity, signal to noise ratio, etc.) in case in which generating the beamforming candidate list.

When a currently selected antenna weight vector combination is a combination adjacent to a previously selected candidate group list, the wireless transmission apparatus 300 may compare the difference in metric once again, and confirm whether the corresponding combination is a combination of a valid route.

When the currently selected antenna weight vector combination is not the combination of the valid route, the wireless transmission apparatus 300 may not include the corresponding combination in the beamforming candidate list, but inspect a next antenna weight vector combination.

Figures 9, 10:
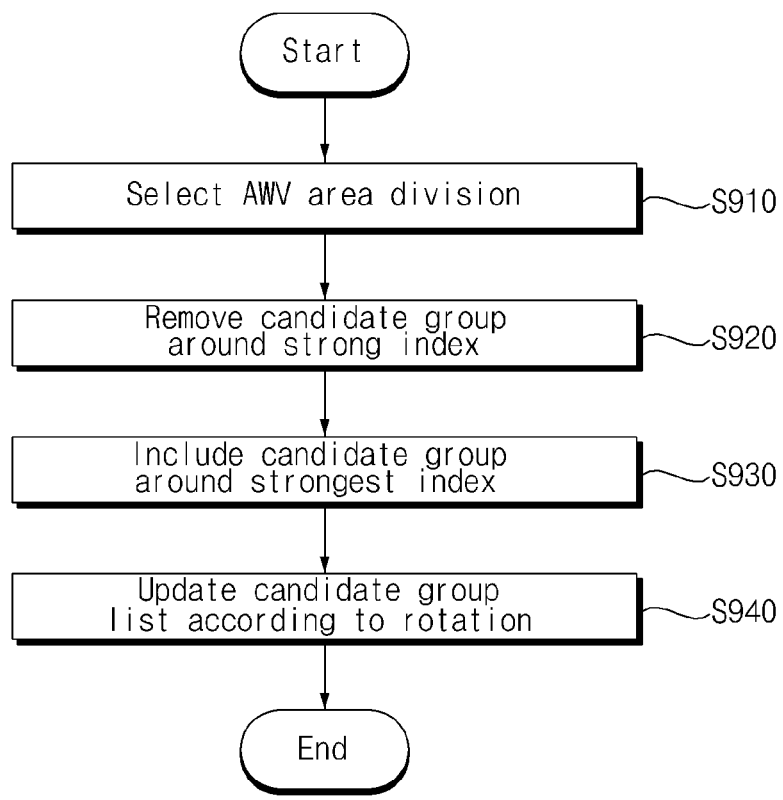
FIG. 9 is a flowchart illustrating another example of an operation method of an image display apparatus according to an embodiment of the present disclosure.
FIGS. 10 to 11E are views referred to for description of the operation method of FIG. 8 or 9.

FIG. 9 is a flowchart illustrating another example of an operation method of an image display apparatus according to an embodiment of the present disclosure.

Referring to FIG. 9, the wireless transmission apparatus 300 in the image display apparatus 100 according to an embodiment of the present disclosure calculates a plurality of antenna based indexes for each area according to a horizontal angle and a vertical angle around antenna apparatuses ANTa and ANTb (S910).

Specifically, the wireless transmission apparatus 300 may calculate an antenna weight vector based (AWV) index for each area according to the horizontal angle and the vertical angle around the antenna apparatuses ANTa and ANTb.

For example, upon the beamforming tracking, the wireless transmission apparatus 300 may transmit training data for each angle or for each sector, and receive response data from the display 180 for each angle or for each sector, calculate a signal to noise ratio or a metric based on response data, and generate a candidate list based on the signal to noise ratio or the metric.

Next, the wireless transmission apparatus 300 may remove a candidate group around an index having a large level among the plurality of antenna based indexes from a candidate list (S920).

That is, the wireless transmission apparatus 300 may remove a candidate group around a strong index among the plurality of antenna based indexes.

Next, the wireless transmission apparatus 300 may include a candidate group around an index having a greatest level among the plurality of antenna based indexes in the candidate list (S930).

That is, the wireless transmission apparatus 300 may include a candidate group around a strongest index among the plurality of antenna based indexes.

For example, the wireless transmission apparatus 300 includes at least one antenna based index around a first index in a beamforming candidate list in case in which a level of the first index among some of the plurality of antenna based indexes is greatest. Accordingly, a valid candidate list for the beamforming tracking can be maintained.

Next, the wireless transmission apparatus 300 may determine at least one of the antenna apparatuses ANTa or ANTb of the wireless transmission apparatus 300 rotates or moves, and update the candidate list in response to the rotation or movement (S940).

For example, in case in which the index having the greatest level among some of the plurality of antenna based indexes is changed, the wireless transmission apparatus 300 may determine that the display 180 or the wireless transmission apparatus 300 rotates or moves.

As another example, in case in which the index having the greatest level among some of the plurality of antenna based indexes is changed from the first index to the second index, the wireless transmission apparatus 300 may determine that the display 180 or the wireless transmission apparatus 300 rotates at a predetermined angle.

Meanwhile, in case in which the index having the greatest level is changed from the first index to the second index, the wireless transmission apparatus 300 may calculate a rotational angle of the display 180 or the wireless transmission apparatus 300.

For example, in case in which the index having the greatest level is changed from the first index to the second index, the wireless transmission apparatus 300 may calculate that a rotational angle of the antenna apparatus ANTa or ANTb of the wireless transmission apparatus 300 is 14°.

In addition, in case in which the rotational angle of the antenna apparatus ANTa or ANTb of the wireless transmission apparatus 300 is equal to or more than a predetermined angle, the case where the rotational angle is equal to or more than the predetermined angle may not be solved due to beamforming change, so the wireless transmission apparatus 300 may wirelessly transmit image data for guiding the display 180 or the antenna apparatus of the wireless transmission apparatus 300 to rotate or move to the display 180. Accordingly, rapid beamforming tracking may be performed in case in which at least one of the wireless transmission apparatus 300 or the display 180 disposed to be spaced apart from each other rotates or moves.

Figure 11A:
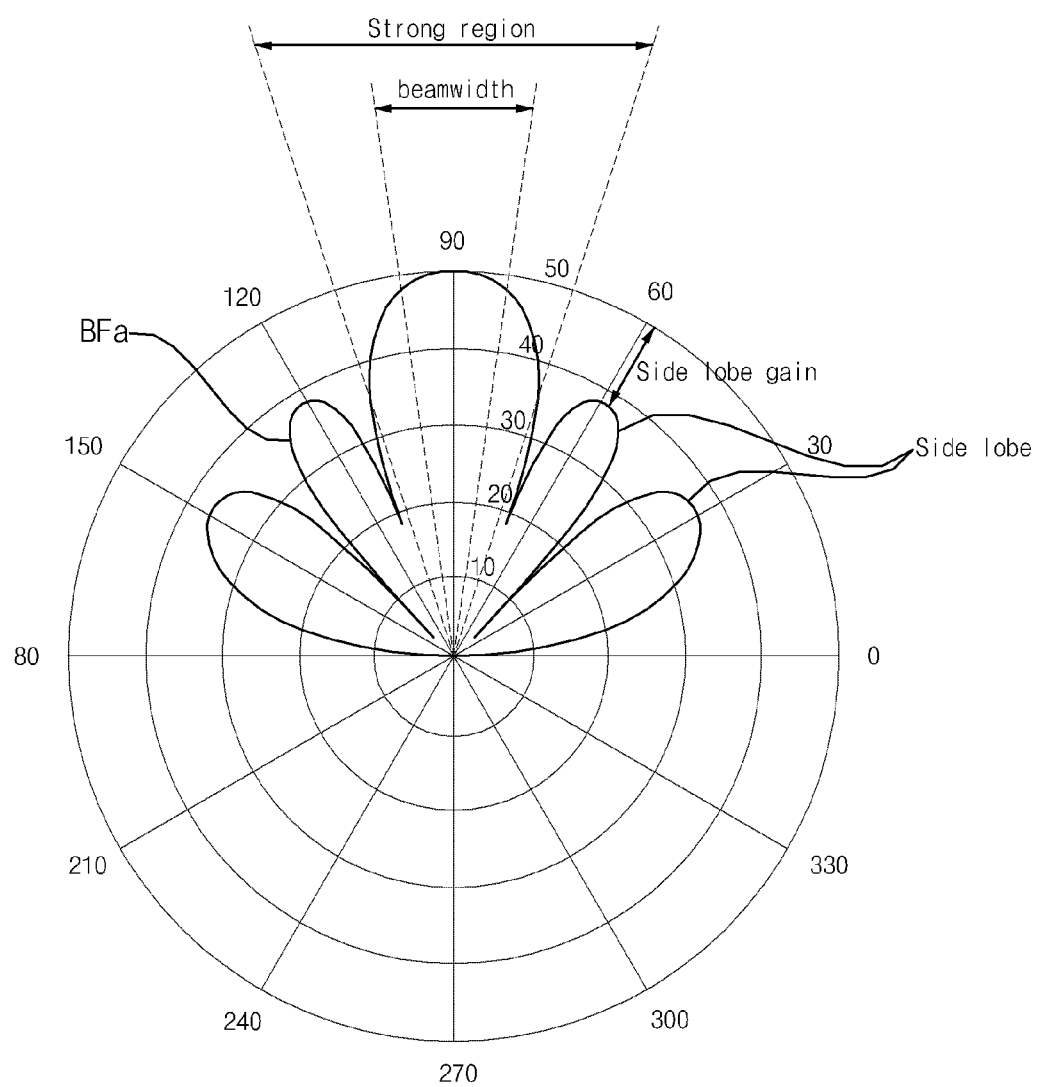
Figure 11B:
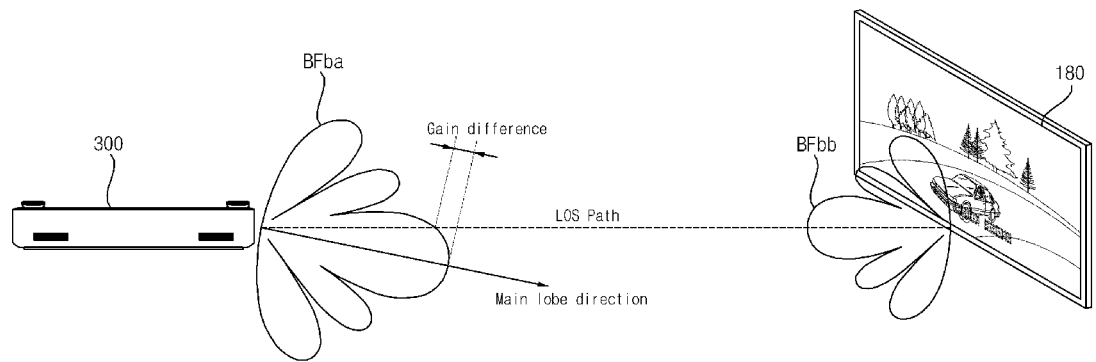
Figure 11C:
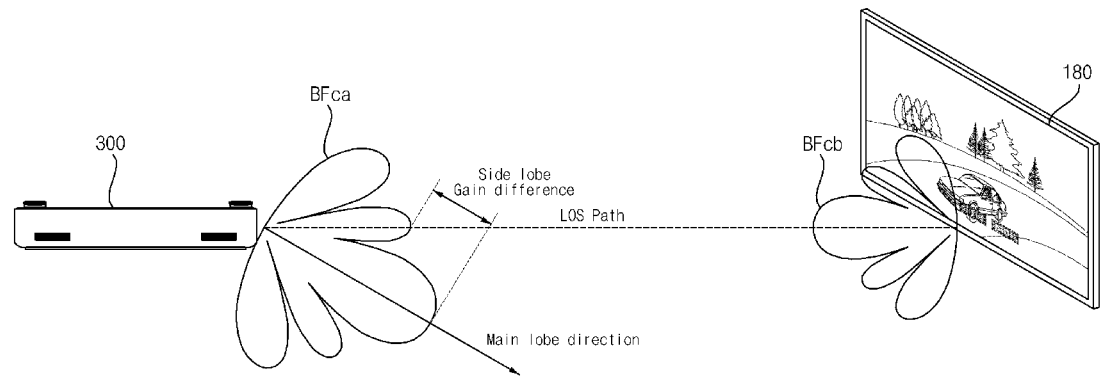
Figure 11D:
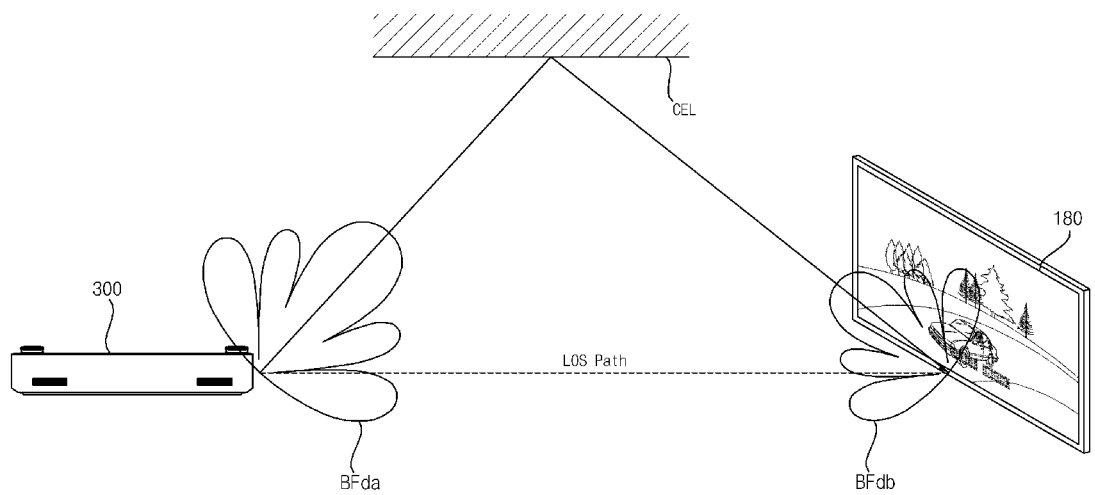
Figure 11E:
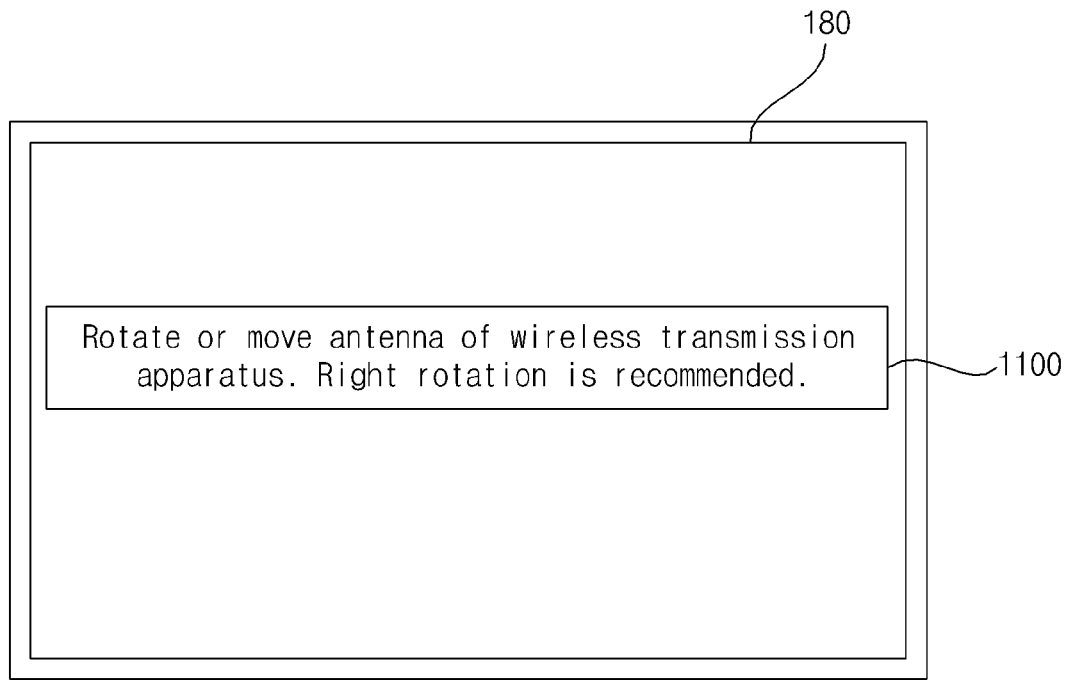
Figure 11E:

FIGS. 10 to 11E are views referred to for description of the operation method of FIG. 8 or 9.

FIG. 10 illustrates one example of antenna weight vector based indexes for each horizontal angle and for each vertical angle of a beam output toward the display 180 from the wireless transmission apparatus 300.

That is, FIG. 10 illustrates an antenna weight vector based index corresponding to an area around the antenna apparatus ANTa or ANTb of the wireless transmission apparatus 300.

Referring to FIG. 10, the area of the index is divided from 70° to −70° based on horizontal 0° and from 70° to −70° based on vertical 0°.

In FIG. 10, it is illustrated that a plurality of AWV indexes is divided into an AWV index of a front area (LOS area) Ara, AWV indexes of left and right areas (wall and reflector area) Arb, and AWV indexes of lower and upper areas (bottom and ceiling areas) Arc.

The wireless transmission apparatus 300 may generate a beamforming candidate list including indexes 0, 1, 2, 5, 42, 19, 30, and 31 among the AWV indexes of the front area Ara, indexes 3, 4, 18, 7, 4, 54, and 47 among the AWV indexes of the left and right areas Arb, and indexes 14, 48, 49, 39, 40, and 41 among the AWV indexes of the lower and upper areas Arc in the plurality of antenna weight vector based indexes of FIG. 10 in relation to step S810 or step S910.

Next, the wireless transmission apparatus 300 may remove a candidate group around a strong index in relation to step S920.

Specifically, the wireless transmission apparatus 300 may exclude, in case in which a difference in signal to noise ratio or a difference in metric between the first index among some of the plurality of antenna based indexes and the second index adjacent to the first index is less than the beam gain, the second index from the beamforming candidate list.

For example, the wireless transmission apparatus 300 may remove indexes 1, 5, and 31 from indexes 0, 1, 2, 5, 42, 19, 30, and 31 which are the AWV indexes of the front area Ara. That is, the wireless transmission apparatus 300 may maintain only indexes 0, 2, 42, 19, and 30. As another example, the wireless transmission apparatus 300 may remove index 4 from indexes 3, 4, 18, 7, 4, 54, and 47 which are the AWV indexes of the left and right areas Arb. That is, the wireless transmission apparatus 300 may maintain only indexes 3, 18, 7, 54, and 47.

As yet another example, the wireless transmission apparatus 300 may remove indexes 48 and 40 from indexes 14, 48, 49, 39, 40, and 41 which are the AWV indexes of the lower and upper areas Arc. That is, the wireless transmission apparatus 300 may maintain only indexes 14, 49, 39, and 41.

Next, the wireless transmission apparatus 300 may include a candidate group around the index having the greatest level among the plurality of antenna based indexes in the candidate list in relation to step S930.

For example, the wireless transmission apparatus 300 may include AWV indexes 1, 8, 12, and 5 around index 0 in the candidate list in case in which index 0 is the greatest among indexes 0, 2, 42, 19, and 30, indexes 3, 18, 7, 54, and 47, and indexes 14, 49, 39, and 41.

Therefore, the wireless transmission apparatus 300 may maintain 0, 2, 42, 19, 30, 1, 8, 12, and 5 as the AWV indexes of the front area Ara, 3, 18, 7, 54, and 47 as the AWV indexes of the left and right areas Arb, and 14, 49, 39, and 41 as the AWV indexes of the lower and upper areas Arc.

Accordingly, a valid candidate list for the beamforming tracking may be maintained. Accordingly, wireless image data transmission may be stably performed between the wireless transmission apparatus 300 and the display 180 disposed to be spaced apart from each other. In particular, seamless image display may be performed between the wireless transmission apparatus 300 and the display 180 disposed to be spaced apart from each other.

Meanwhile, the number of adjacent antenna weight vector indexes may be determined based on the size of the main lobe and the resolution of the antenna weight vector index.

For example, the number of adjacent antenna weight vector indexes may increase as the size of the main lobe of the beam is larger and the beamwidth is larger. Therefore, the number of removed adjacent antenna weight vector indexes may also increase as the size of the main lobe of the beam is larger and the beamwidth is larger.

As another example, the number of adjacent antenna weight vector indexes may increase as the resolution of the antenna weight vector index is larger. Therefore, the number of removed adjacent antenna weight vector indexes may also increase as the resolution of the antenna weight vector index is larger and the beamwidth is larger.

FIG. 11A is a view illustrating a shape of a beam between 0° to 360° around the wireless transmission apparatus 300.

Meanwhile, in the case of the beam output from the wireless transmission apparatus 300, a main lobe is generated in an oriented direction and a side lobe is generated around the main lobe.

Referring to FIG. 11A, in the case of the wireless transmission apparatus 300, the main lobe having a greatest intensity based on 90° and the side lobe around the main lobe are illustrated.

In FIG. 11A, it is illustrated that the side lobe is generated around 60°, 120°, 30°, and 150°.

Meanwhile, it is illustrated that a gain of the main lobe is greatest and the gain of the side lobe is less than the gain of the main lobe.

Meanwhile, a beamwidth of the main lobe may be defined as an area having −3 dB based on a highest level.

FIG. 11B illustrates a case where an orienting direction of the main lobe is oriented to a lower side of the display 180, but the main lobe in a beam Bfba output from the wireless transmission apparatus 300 is partially oriented, so a signal quality is measured by the main lobe at the time of measuring the signal quality.

As in FIG. 11B, in case in which the gain of the main lobe is larger than the gain of the side lobe, in particular, in case in which a difference in signal to noise ratio or a difference in metric between a first index and a second index adjacent to the first index among some of a plurality of antenna based indexes is less than a beam gain, the second index should be regarded as the same route as the first index, so it is preferable to remove the second index. Accordingly, a candidate list may be efficiently managed.

FIG. 11C illustrates a case where the side lobe other than the main lobe among beams BFca output from the wireless transmission apparatus 300 is oriented to the display 180, and the signal quality is measured by the side lobe other than the main lobe at the time of measuring the signal quality.

That is, it is illustrated that a main lobe direction is not the display 180, but is oriented to a different direction.

The wireless transmission apparatus 300 may manage an AWV index having an excellent signal quality for each area, and perform beamforming by using an AWV index maintained in the candidate list as described in FIG. 10 in case in which the gain of the side lobe is larger than the gain of the main lobe.

For example, the wireless transmission apparatus 300 may perform the beamforming by using an AWV index corresponding to the side lobe other than an AWV index corresponding to the main lobe.

Meanwhile, in case in which the index around the antenna weight vector index is less than a side gain or a threshold, the wireless transmission apparatus 300 does not the index in a candidate group, and exclude a candidate group of a duplicated route to manage a valid antenna weight vector list with a small number of candidate lists, thereby enabling rapid reaction to a surrounding environment.

FIG. 11D illustrates a case where the side lobe other than the main lobe among beams BFda output from the wireless transmission apparatus 300 is oriented to the display 180, and the signal quality is measured by the side lobe other than the main lobe at the time of measuring the signal quality.

That is, it is illustrated that the main lobe direction is not the display 180, but is oriented to a ceiling (CEL) direction.

The wireless transmission apparatus 300 may manage an AWV index having an excellent signal quality for each area, and perform beamforming by using an AWV index maintained in the candidate list as described in FIG. 10 in case in which the gain of the side lobe is larger than the gain of the main lobe.

In particular, the wireless transmission apparatus 300 may control an AWV index corresponding to the ceiling (CEL) direction to be included in the candidate list, and as a result, a reflection route may be included, which enables efficient candidate list management.

Meanwhile, the wireless transmission apparatus 300 may divide the antenna weight vector indexes into a ceiling, a wall, and a bottom which are different directions, or an antenna weight vector index of a front direction among the antenna weight vector indexes.

In addition, the wireless transmission apparatus 300 may include the antenna weight vector index in a beamforming candidate list for beamforming tracking, which shows an excellent quality in each area.

Meanwhile, an azimuth or elevation direction may be determined for each antenna weight vector index based on a design of the antenna weight vector index, and the antenna weight vector indexes may be divided into an area which may have a different route as prior information.

Meanwhile, an index corresponding to a route of the ceiling, the wall, or the bottom is also included in the candidate list, so an LOS route is blocked by generation of a blocker, the LOS route may be quickly switched to an NLOS route.

FIG. 11E illustrates that an object 1100 representing antenna rotation or movement is displayed in the display 180.

Referring to FIG. 11E, in case in which the index having the greatest level among some of the plurality of antenna based indexes is changed from the first index to the second index, it may be determined that the display 180 or the wireless transmission apparatus 300 rotates at a predetermined angle.

Meanwhile, the wireless transmission apparatus 300 may wirelessly transmit image data for guiding the display 180 or the antenna apparatus ANTa or ANTb of the wireless transmission apparatus 300 to rotate or move to the display in case in which a rotational angle of the display 180 or the wireless transmission apparatus 300 is equal to or more than a predetermined angle.

Accordingly, as in FIG. 11E, an object 1100 guiding the antenna apparatus ANTa or ANTb to rotate or move may be displayed in the display 180.

In this case, the object 1100 may include information such as a rotational direction, a rotational angle, etc., of the antenna apparatus ANTa or ANTb.

Alternatively, the object 1100 may include information such as a movement direction, a movement distance, etc., of the antenna apparatus ANTa or ANTb.

In addition, in case in which a user rotates or moves at least one of the antenna apparatuses ANTa or ANTb, the best wireless beamforming may be formed. Accordingly, rapid beamforming tracking may be performed in case in which at least one of the wireless transmission apparatus 300 or the display 180 disposed to be spaced apart from each other rotates or moves.

Meanwhile, in case in which only the antenna apparatus of the wireless transmission apparatus 300 of the wireless transmission apparatus 300 or the display 180 rotates, the wireless transmission apparatus 300 may include an antenna weight vector around an antenna weight vector index having a best or highest level in the candidate list.

In addition, the wireless transmission apparatus 300 may set an antenna weight vector index of a display 180 which does not rotate similarly to the antenna weight vector index having the best or highest level.

Meanwhile, in case in which a quality of an adjacent antenna weight vector index becomes better than the best antenna weight vector index, the wireless transmission apparatus 300 may regard that the apparatus rotates, and update beamforming candidate lists for beamforming tracking of the rotated apparatus by a rotated amount or angle.

Configurations and methods of the described embodiments may not be limitedly applied to the image display apparatus according to the embodiment of the present disclosure, but all or some of the respective embodiments may be selectively combined and configured so as to be variously modified.

Further, although the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

INDUSTRIAL APPLICABILITY

The present disclosure is applicable to a display apparatus and an image display apparatus including the same, and more particularly, to being applicable to a display apparatus and an image display apparatus including the same which may perform rapid beamforming tracking in case in which a blocker is generated between a wireless transmission apparatus and a display disposed to be spaced apart from each other.

What is claimed is:

1. An image display apparatus comprising:
   a display; and
   a wireless transmission apparatus spaced apart from the display and configured to transmit image data to the display by a wireless communication,
   wherein the wireless transmission apparatus includes at least one antenna apparatus for wirelessly transmitting the image data to the display, and
   wherein the wireless transmission apparatus is configured to:
   generate a beamforming candidate list including some of a plurality of antenna weight vector based indexes corresponding to an area around the at least one antenna apparatus for beamforming tracking of a beam outputted by the at least one antenna apparatus,
   in a case in which a difference in signal to noise ratio or a difference in metric between a first index among some of the plurality of antenna weight vector based indexes and a second index adjacent to the first index is less than a beam gain of the beam, exclude the second index from the beamforming candidate list,
   in a case in which an index having a greatest level among some of the plurality of antenna weight vector based indexes is changed, determine that the display or the wireless transmission apparatus has rotated or been moved, and
   wirelessly transmit image data for guiding the display or the at least one antenna apparatus of the wireless transmission apparatus to rotate or move relative to the display in a case in which a rotational angle of the display or the wireless transmission apparatus is equal to or more than a predetermined angle.

2. The image display apparatus according to claim 1, wherein a level of the first index is greater than a level of the second index.

3. The image display apparatus according to claim 1, wherein the wireless transmission apparatus is configured to exclude the second index from the beamforming candidate list in a case in which the difference in the signal to noise ratio between the first index among some of the plurality of antenna weight vector based indexes and the second index adjacent to the first index is less than a gain of a side lobe of the beam.

4. The image display apparatus according to claim 1, wherein the wireless transmission apparatus is configured to increase a number of indexes deleted from a candidate list adjacent to the first index as a beamwidth of a main lobe of the beam increases.

5. The image display apparatus according to claim 1, wherein the wireless transmission apparatus is configured to:
   delete the second index adjacent to the first index from the beam forming candidate list in a case in which a beamwidth of a main lobe of the beam is a first beamwidth, and
   delete the second index and a third index adjacent to the first index from the beam forming candidate list in a case in which the beamwidth of the main lobe of the beam is a second beamwidth larger than the first beamwidth.

6. The image display apparatus according to claim 1, wherein the wireless transmission apparatus is configured to:
   select indexes in a case in which the signal to noise ratio or the metric is equal to or more than a reference value among a plurality of antenna weight vector based indexes for each region according to a horizontal angle and a vertical angle around the at least one antenna apparatus, and exclude the second index from the beamforming candidate list in a case in which the difference in the signal to noise ratio or the difference in metric between the first index and the second index adjacent to the first index among the selected indexes is less than a beam gain.

7. The image display apparatus according to claim 1, wherein the wireless transmission apparatus is configured to calculate a combination of a single stream based transmission weight vector based index and a single stream reception weight vector based index, calculate a dual stream based transmission weight vector based index and a dual stream reception weight vector based index, and perform beamforming tracking after the calculate the combination and the calculate the dual stream.

8. The image display apparatus according to claim 1, wherein upon the beamforming tracking, the wireless transmission apparatus is configured to transmit training data for each angle or for each sector, receive response data from the display for the each angle or for the each sector, calculate the signal to noise ratio or the metric based on the response data, generate the beam forming candidate list based on the signal to noise ratio or the metric, and exclude the second index from the beamforming candidate list in a case in which the difference in the signal to noise ratio or the difference in metric between the first index and the second index adjacent to the first index among some of the plurality of antenna weight vector based indexes is less than the beam gain.

9. The image display apparatus according to claim 1, wherein the wireless transmission apparatus includes at least one antenna weight vector based index around the first index in the beamforming candidate list in a case in which a level of the first index among the plurality of antenna weight vector based indexes is greatest.

10. The image display apparatus according to claim 1, wherein in a case in which the index having the greatest level among some of the plurality of antenna weight vector based indexes is changed, the wireless transmission apparatus is configured to update the beamforming candidate list.

11. The image display apparatus according to claim 1, wherein in a case in which the index having the greatest level among some of the plurality of antenna weight vector based indexes is changed from the first index to the second index, the wireless transmission apparatus is configured to determine that the display or the wireless transmission apparatus rotates at a predetermined angle.

* * * * *